US008289561B2

(12) United States Patent
Ono et al.

(10) Patent No.: US 8,289,561 B2
(45) Date of Patent: Oct. 16, 2012

(54) ALBUM CREATING SYSTEM, ALBUM CREATING METHOD AND ALBUM CREATING PROGRAM FOR CREATING ALBUM ACCORDING TO LAYOUT INFORMATION

(75) Inventors: Shuji Ono, Ashigarakami-gun (JP); Akira Yoda, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 384 days.

(21) Appl. No.: 12/094,231

(22) PCT Filed: Nov. 15, 2006

(86) PCT No.: PCT/JP2006/323254
§ 371 (c)(1),
(2), (4) Date: May 19, 2008

(87) PCT Pub. No.: WO2007/058367
PCT Pub. Date: May 24, 2007

(65) Prior Publication Data
US 2009/0164561 A1    Jun. 25, 2009

(30) Foreign Application Priority Data

Nov. 17, 2005  (JP) ................................. 2005-333053
Oct. 31, 2006  (JP) ................................. 2006-296978

(51) Int. Cl.
*G06F 3/14*       (2006.01)
*G06F 15/16*     (2006.01)
(52) U.S. Cl. ........................................ 358/1.18; 358/1.9
(58) Field of Classification Search .................. 358/1.18, 358/1.9
See application file for complete search history.

(56) References Cited

U.S. PATENT DOCUMENTS

| | | | | |
|---|---|---|---|---|
| 6,647,125 B2* | 11/2003 | Matsumoto et al. | .......... | 382/100 |
| 2002/0093681 A1* | 7/2002 | Hitaka | .......... | 358/1.15 |
| 2003/0220995 A1* | 11/2003 | Hitaka et al. | .......... | 709/223 |
| 2005/0002063 A1* | 1/2005 | Hanamoto | .......... | 358/1.18 |
| 2005/0225799 A1* | 10/2005 | Berarducci et al. | .......... | 358/1.15 |
| 2005/0237578 A1 | 10/2005 | Ikeda et al. | | |

FOREIGN PATENT DOCUMENTS

| | | |
|---|---|---|
| EP | 1 471 720 A1 | 10/2004 |
| JP | 11-194903 A | 7/1999 |
| JP | 2003-346167 A | 12/2003 |
| JP | 2004-48284 A | 2/2004 |
| JP | 2005-102222 A | 4/2005 |
| JP | 2005-199575 A | 7/2005 |

\* cited by examiner

*Primary Examiner* — Benn Q Tieu
*Assistant Examiner* — Qian Yang
(74) *Attorney, Agent, or Firm* — Sughrue Mion, PLLC

(57) ABSTRACT

An album creating system is provided for speedily creating an album in which images appropriate for the album are automatically laid out without selecting the images to be laid out in the album by a user. The album creating system according to the present invention includes: a low-quality image receiving section for receiving a low-quality image; a layout information generating section for generating layout information on a low-quality image album in which the low-quality image is laid out; a layout information storage section for storing the layout information in association with order identification information an order identification information transmitting section for transmitting the order identification information to the album orderer terminal; an order identification information acquiring section for acquiring a high-quality image corresponding to the low-quality image from the album orderer; a layout information acquiring section for acquiring layout information; and an album creating section for creating a high-quality image album by laying out the high-quality image according to the layout information.

5 Claims, 15 Drawing Sheets

IMAGE STORAGE SECTION 50

| PROVISION USER ID | LOW QUALITY IMAGE | TIME AND DATE | LOCATION | VIEWABLE USER ID |
|---|---|---|---|---|
| 3000 | #600 | 2006.09.03 15:00 | 35°14'N, 139°8'E | 2000 |
| 3100 | #610 | 2006.09.03 12:00 | 35°26'N, 140°22'E | 2500 |
| ...... | ...... | ...... | ...... | ...... |

FIG. 9

IMAGE STORAGE SECTION 50

| PROVISION USER ID | GROUP ID | LOW QUALITY IMAGE | TIME AND DATE | LOCATION | SHARABLE/ NON-SHARABLE |
|---|---|---|---|---|---|
| 3000 | 4000 | #650 | 2006.08.30 10:00 | 36°16′N, 130°25′E | ○ |
| 3100 | 4100 | #670 | 2006.09.10 11:30 | 35°33′N, 140°27′E | × |
| ...... | ...... | ...... | ...... | ...... | ...... |

*FIG. 10*

DISPLAY SECTION 170

☐ DEFAULT

☐ FAMILY

☐ BROTHER AND SISTER

☐ FRIEND

⋮   ⋮

☐   PHOTOGRAPHER A
    (HAVING A CHARGE)

ALBUM CREATING SYSTEM, ALBUM CREATING METHOD AND ALBUM CREATING PROGRAM FOR CREATING ALBUM ACCORDING TO LAYOUT INFORMATION

TECHNICAL FIELD

The present invention relates to an album creating system, an album creating method, and an album creating program. Particularly, the present invention relates to an album creating system and an album creating method for creating an album using images provided from a user, and an album creating program. The present application relates to and claims priority from Japanese Patent Application No. 2005-333053 filed in Japan on Nov. 17, 2005 and Japanese Patent Application No. 2006-296978 filed in Japan on Oct. 31, 2006, the contents of which are incorporated herein by reference for all purpose if applicable in the designated state.

BACKGROUND ART

For example, a first method which has been disclosed in Japanese Patent Application Publication No. 10-200730, includes the steps of reading an image with low-resolution; causing the user to edit the read image; recording edit information indicative of the edited content which is applied on the image by the user; reading the image with high-solution; and editing/outputting the read image with high-resolution based on the recorded edit information. Additionally, a second method which has been disclosed as in Japanese Patent Application Publication No. 2004-318221 includes the steps of: transmitting images and order information to a server online and ordering to create media by a user; and transmitting a preview of the ordered media in the form of an image with low-resolution such as a thumbnail to a terminal of the user. Further, a third method which has been disclosed as in Japanese Patent Application Publication No. 2004-48284 includes the steps of: selecting a template including image frames through a cell-phone unit by a user; causing the user to designate an image to be fitted into the image frame included in the selected template; and printing the image desired by the user. Here, the server which has acquired image information from the cell-phone issues an order sheet. Then, the user designates one by one image numbers filled in the order sheets issued by the server.

DISCLOSURE OF THE INVENTION

Problems to be Solved by the Invention

However, in the above-described first method, it takes a lot of troubles for the user who is not accustomed to edit images. Additionally, in the second method, firstly the user transmits all images including images with a high-quality which are not used to create an album. Therefore, since a large number of images with a high-quality are transmitted to the server, it takes a large amount of time dependent on a communication speed, and the communication traffic and the communication cost may be increased. Further, in the third method, since the user has to input all the identification numbers of images desired to print into the cell-phone one by one, it takes a lot of work for the user.

Thus, the object of the present invention is to provide an album creating system, an album creating method, and an album creating program which are capable of solving the problem accompanying the conventional art. The above and other advantages can be achieved by combining the features recited in independent claims. Then, dependent claims define further effective specific example of the present invention.

Means for Solving the Problems

In order to solve the above described problems, a first aspect of the present invention provides an album creating system for creating an album using images provided from an album orderer. The album creating system includes: a low quality image receiving section for receiving a low quality image obtained by reducing the quality of a high-quality image by the album orderer from an album orderer terminal; a layout information generating section for generating layout information on a low quality image album in which the low quality image received by the low quality image receiving section is laid out; a layout information storage section for storing therein the layout information generated by the layout information generating section in association with order identification information to identify an order of the album; an order identification information transmitting section for transmitting the order identification information stored in the layout information storage section to the album orderer terminal; an order identification information acquiring section for acquiring a high-quality image corresponding to the low quality image received by the low quality image receiving section along with the order identification information transmitted by the order identification information transmitting section; a layout information acquiring section for acquiring the layout information stored in the layout information storage section in association with the order identification information acquired by the order identification information acquiring section; and an album creating section for creating a high-quality image album by laying out the high-quality image acquired by the order identification information acquiring section according to the layout information acquired by the layout information acquiring section.

Additionally, the low quality image receiving section may receive a low-resolution image obtained by reducing the resolution of a high-resolution image by the album orderer. Then, the order identification information acquiring section may acquire the order identification information transmitted by the order identification information transmitting section and a high-quality image corresponding to the low quality image received by the low quality image receiving section which are recorded on a recording medium by the album orderer. Further, the layout information creating section may create layout information on a plurality of low quality image albums of which layout of the low quality images received by the low quality image receiving section is different from each other. The layout information storage section stores order identification information including a plural pieces of layout information generated by the layout information generating section and layout identification information to identify the plural pieces of layout information. The layout information acquiring section may acquire a plural pieces of layout information stored in the layout information storage section in association with the order identification information acquired by the order identification information acquiring section. The album creating section may create a high-quality image album by laying out the high-quality image acquired by the order identification information acquiring section according to the layout information selected by the album orderer among the plural pieces of layout information acquired by the layout information acquiring section.

Further, the layout information generating section may generate a plural pieces of layout information of a low quality image album of which layout of the low quality images received by the low quality image receiving section is different from each other. The layout information storage section may store order identification information including plural pieces of layout information generated by the layout information generating section and layout identification information to identify the plural pieces of layout information. The order identification information transmitting section may transmit order identification information including plural pieces of layout information stored in the layout information storage section and layout identification information to the album orderer terminal. The order identification information acquiring section may acquire the layout identification information to identify the layout information selected by the album orderer among the plural pieces of layout information transmitted by the order identification information transmitting section. The layout information acquiring section may acquire the layout information stored in the layout information storage section in association with the layout identification information acquired by the order identification information acquiring section. Further, the album creating system further include a sample creating section for creating a sample of the album with the layout indicated by each of the plural pieces of layout information generated by the layout information generating section, and a sample transmitting section for transmitting a plurality of album samples created by the sample creating section to the album orderer terminal to cause the album orderer to view the plurality of samples.

A second aspect of the present invention provides an album creating system for creating an album using images provided by an album orderer. The album creating system includes a layout information generating apparatus for generating layout information on the album and an album creating apparatus for creating an album according to the layout information generated by the layout information generating apparatus. The layout information generating apparatus includes: a low quality image receiving section for receiving a low quality image obtained by reducing the quality of a high-quality image by the album orderer from an album orderer terminal; a layout information generating section for generating layout information on a low quality image album in which the low quality image received by the low quality image receiving section is laid out; a layout information storage section for storing therein the layout information generated by the layout information generating section in association with order identification information to identify an order of the album; and an order identification information transmitting section for transmitting the order identification information stored in the layout information storage section to the album orderer terminal. The album creating apparatus includes: an order identification information acquiring section for acquiring a high-quality image corresponding to the low quality image received by the low quality image receiving section along with the order identification information transmitted by (the order identification information transmitting section; a layout information acquiring section for acquiring the layout information stored in the layout information storage section in association with the order identification information acquired by the order identification information acquiring section; and an album creating section for creating a high-quality image album by laying out the high-quality image acquired by the order identification information acquiring section according to the layout information acquired by the layout information acquiring section.

A third aspect of the present invention provides an album creating method for creating an album using images provided from an album orderer. The album creating method includes the steps of: receiving a low quality image obtained by reducing the quality of a high-quality image by the album orderer from an album orderer terminal; generating layout information on a low quality image album in which the low quality image received in the low quality image receiving step is laid out; storing the layout information generated in the layout information generating section in a layout information storage section in association with order identification information to identify an order of the album; transmitting the order identification information stored in the layout information storage section to the album orderer terminal; acquiring a high-quality image corresponding to the low quality image received in the low quality image receiving step along with the order identification information transmitted in the order identification information transmitting step; acquiring the layout information stored in the layout information storage section in association with the order identification information acquired in the order identification information acquiring step; and an album creating section for creating a high-quality image album by laying out the high-quality image acquired in the order identification information acquiring step according to the layout information acquired in the layout information acquiring step.

A fourth aspect of the present invention provides an album creating program for an album creating system for crating an album using images provided from an album orderer. The album creating program causes the album creating system to function as: a low quality image receiving section for receiving a low quality image obtained by reducing the quality of a high-quality image by the album orderer from an album orderer terminal; a layout information generating section for generating layout information on a low quality image album in which the low quality image received by the low quality image receiving section is laid out; a layout information storage section for storing therein the layout information generated by the layout information generating section in association with order identification information to identify an order of the "album; an" order identification information transmitting section for transmitting the order identification information stored in the layout information storage section to the album orderer terminal; an order identification information acquiring section for acquiring a high-quality image corresponding to the low quality image received by the low quality image receiving section along with the order identification information transmitted by the order identification information transmitting section; a layout information acquiring section for acquiring the layout information stored in the layout information storage section in association with the order identification information acquired by the order identification information acquiring section; and an album creating section for creating a high-quality image album by laying out the high-quality image acquired by the order identification information acquiring section according to the layout information acquired by the layout information acquiring section.

Here, all necessary features of the present invention are not listed in the summary of the invention. The sub-combinations of the features may, become the invention.

Effect of the Invention

According to the present invention, an album in which high-quality images appropriate for the template of the album are automatically laid out can be automatically and speedily created without selecting the high-quality image for the album and laying out the same in the template of the album by the user.

BEST MODE FOR CARRYING OUT THE
INVENTION

Hereinafter, the present invention will now be described through preferred embodiments. The embodiments do not limit the invention according to claims and all combinations of the features described in the embodiments are not necessarily essential to means for solving the problems of the invention.

FIG. 1 is a schematic diagram of an album creating system 40 according to an embodiment of the present invention. The album creating system 40 includes an album orderer terminal 10, a layout information generating apparatus 20 and an album crating apparatus 30. The album orderer terminal 10 includes a main body 12, a display 14 and a printer 16. The album orderer terminal 110 may be such as a personal home computer. The layout information generating apparatus 20 is such as a server connected to the album orderer terminal 10 and the album creating apparatus 30 through a network such as Internet, for laying out images in the album. The album creating apparatus 30 may be a terminal installed in a shop (such as a kiosk) where albums are created.

The album creating system 40 transmits a low quality image from the album orderer terminal 10 to the layout information generating apparatus 20, and then, layout information generating apparatus 20 creates a layout of the album by the received low quality image. Then, the layout information generating apparatus 20 transmits layout information on the generated layout of the album to the album orderer terminal 10 along with layout identification information to identify the layout information. Next, the layout information generating section 20 provides layout identification information corresponding to the layout information selected by the user and a high-quality image to the album creating apparatus 30 through a recording medium such as a memory.

Here, the layout identification information and the high-quality image may be provided to the album creating apparatus 30 through a recording medium included in a personal digital assistance such as a cellular phone. Acquiring the layout identification information, the album creating apparatus 30 transmits the acquired layout identification information to the layout information generating apparatus 20 and receives the layout information corresponding to the layout identification information from the layout information generating apparatus 20. Then, the album creating apparatus 30 extracts the high-quality image corresponding to the low quality image included in the layout information received from the layout information generating apparatus 20 and allocates the extracted high-quality image to the page of the album according to the layout information to create an album.

In the album creating system 40 according to the present embodiment, the album creating apparatus 30 receives the layout identification information corresponding to the album sample selected by the user and the high-quality image and receives the layout information corresponding to the received layout identification information from the layout information generating apparatus 20 to create speedily an album desired by the user without selecting the high-quality image to be laid out in the album by the user.

Specifically, in the album creating system 40 according to the present embodiment, the album orderer terminal 10 stores images captured and held by the user. The album orderer terminal 10 firstly generates a low quality image of the stored image. Here, the low quality image may be a low-resolution image. The album orderer terminal 10 provides a low quality image corresponding to the stored image to the layout information generating apparatus 20.

The layout information generating apparatus 20 selects a low quality image appropriate to be laid out in the album among the low quality images received from the album orderer terminal 10 and lays out the selected low quality image in the album to create an album sample. Then, the layout information generating apparatus 20 provides the created album sample to the album orderer terminal 10 in association with the order identification information to identify an order of the album. Here, layout information on the album in which low quality images are laid out and layout identification information to uniquely identify the layout information are associated with the order identification information.

The album orderer terminal 10 displays the album samples received from the layout information generating apparatus 20 on such as a display 14 and causes the user to view the same and select a desired album sample. After the user selects the desired album sample, the album orderer terminal 10 stores the layout identification information corresponding to the layout information of the album sample selected by the user and a high-quality image on a storage medium such as a memory and provides the same to the album creating apparatus 30 through the memory.

Next, the album creating apparatus 30 transmits the layout identification information read from the storage medium such as a memory to the layout information generating apparatus 20 and receives the layout information corresponding to the layout identification information from the layout information generating apparatus 20. Then, the album creating apparatus 30 creates the album using the high-quality image and the layout information read from the storage medium such as a memory. Here, the album creating apparatus 30 may record the album on a storage medium such as a DVD. Alternatively, the album creating apparatus 30 may provide online the created album to the album orderer terminal 10 as electronic data.

According to another embodiment, the album orderer terminal 10 receives the album sample from the layout information generating apparatus 20 and then, causes the user to select a desired album sample. Then, the album orderer terminal 10 analyzes the layout information corresponding to the album sample selected by the user and extracts a high-quality image corresponding to the low quality image included in the album sample. Then, the album orderer terminal 10 may create an album by allocating the extracted high-quality image to each of a plurality image layout frames included in a plurality of album pages in the album sample. The album orderer terminal 10 prints the created album on a paper medium and outputs the same by a printer 16. Additionally, the main body 12 of the album orderer terminal 10 may record the created album on a recording medium such as a DVD.

According to another embodiment, the album creating apparatus 30 generates a low quality image obtained by reducing the quality of the high-quality image received from the user through the recording medium such as a memory. Then, the album creating apparatus 30 provides the low quality image to the layout information generating apparatus 20. The layout information generating section 20 selects a low quality image appropriate to be laid out in the album among the low quality images received from the album creating apparatus 30 and lays out the selected low quality image in the template of the album to create an album sample. Then, the layout information generating apparatus 20 provides the created album sample to the album creating apparatus 30 in association with order identification information to identify an order of the album.

The album creating apparatus 30 presents the album sample received from the layout information generating apparatus 20 to the user and causes the user to select a desired album sample. After the user selects the desired album sample, the album creating apparatus 30 allocates the high-quality image corresponding to the low quality image included in the selected album to each of a plurality of image layout frames included in the pages of the album to create the album. The album creating apparatus 30 may record the created album on a recording medium such as a DVD. Here, information on images in the album orderer terminal 10, the layout information generating apparatus 20 and the album creating apparatus 30 may be transmitted/received through a network such as radio communication, cable communication and Internet.

FIG. 2 shows an example of functional configuration of the album orderer terminal 10 according to the present embodiment. The album orderer terminal 10 includes an image input section 100, a high-quality image storage section 110, a low quality image storage section 112, an image quality converting section 120, an image identification information adding section 130, an image extracting section 140, a sample selecting section 150, a display section 170, an image output section 180, an orderer terminal receiving section 190 and an orderer terminal transmitting section 195.

The image input section 100 receives high-quality images outside of the album orderer terminal 10 through a memory and a network such as Internet. Additionally, the image input section 100 may receive high-quality images from an image capturing device or an image viewer which stores the high-quality images through radio or cable communication. Further, the image input section 100 may receive image information which can be identified when the received high-quality images are captured, such as information on the resolution of the high-quality image, information on the frequency component of the high-quality image, information on the focused distance when the high-quality image is captured, image capturing location and image capturing time and date. The image input section 100 provides the received high-quality images and image information to the high-quality image storage section 110.

The high-quality image storage section 110 stores therein the high-quality image and the image information received from the image input section 100 in association with the identifier to uniquely identify the high-quality image. The high-quality image storage section 110 stores directly the received high-quality image without reducing image data of the received high-quality image. The high-quality image storage section 110 provides the high-quality images to the image quality converting section 120 and the image extracting section 140.

The image quality converting section 120 generates a low quality image by reducing the quality of the high-quality image. Specifically, the image quality converting section 120 reduces an amount of data of the high-quality image received from the high-quality image storage section 110 to create a low quality image. The image quality converting section 120 may convert the received image to a low quality image by irreversibly compressing the received image. When the received image is a still image, the image quality converting section 120 compresses the captured image using an image compression method such as JPEG. Alternatively, when the received image is a moving image, the image quality converting section 120 compresses the captured image using an image compression method such as MPEG.

As for further compression means, the image quality converting section 120 may generate a low quality image by reducing the size or resolution of the high-quality image. Additionally, the image quality converting section 120 may generate a low quality image by eliminating high frequency component of the high-quality image. Further, when the frequency of the image is converted for each of a predetermined region and stored, the image quality converting section 120 eliminates the number of frequency components to be stored or the number of bits indicative of the level of the frequency component to increase the compressibility of the image. Here, the low quality image generating section recited in Claims is an example of the image quality converting section 120. The image quality converting section 120 provides the generated low quality image to the low quality image storage section 112 and the image identification information adding section 130.

The image identification information adding section 130 adds corresponding information indicating that the high-quality image is corresponded to the low quality image obtained by reducing the quality of the high-quality image to the high-quality image and low quality image. Specifically, the image identification information adding section 130 adds image identification information to correspond the low quality image received from the image quality converting section 120 and the high-quality image being an original image of the low frequency image to the low quality image and the high-quality image as corresponding information. Referring the image identification information, the high-quality image corresponding to the low frequency image can be identified. The image identification information adding section 130 provides the image identification information to the high-quality image storage section 110 and the low quality image storage section 112.

Here, the corresponding information adding section recited in Claims is an example of the image identification information adding section 130. The low quality image storage section 112 stores the low quality image generated by the image quality converting section 120 and the image identification information corresponding to the low quality image, which is received from the image identification information adding section 130. Here, the high-quality image storage section also stores the image identification information received from the image identification information adding section 130. The low quality image storage section 112 provides the low quality image to the orderer terminal transmitting section 195. Additionally, the high-quality image storage section 110 provides the image information of the high-quality image corresponding to the low quality image provided by the low quality image storage section 112 to the orderer terminal transmitting section 195.

The orderer terminal transmitting section 195 provides the low quality image and the image information received from the low quality image storage section 112 to the layout information generating apparatus 20. Here, the low quality image provided to the layout information generating apparatus 20 may be at least a part of low frequency images stored in the low quality image storage section 112. The orderer terminal transmitting section 195 provides the high-quality image to the album creating apparatus 30. Additionally, the orderer terminal transmitting section 195 may provide the low quality image, the image identification information and the high-quality image to the layout information generating apparatus 20 and the album creating apparatus 30 through a memory, a network such as Internet, cable communication and radio communication.

The orderer terminal receiving section 190 receives plural pieces of order identification information from the layout information generating apparatus 20. Here, order identification information may include layout information of the album created by the layout information generating apparatus 20, layout identification information to identify the layout information and information on album samples. The orderer terminal receiving section 190 provides the received order identification information to the sample selecting section 150 and the image extracting section 140. Specifically, the orderer terminal receiving section 190 provides information on the album samples along with the order identification information to the sample selecting section 150 and provides the layout information and the layout identification information to the image extracting section along with the order identification information.

The sample selecting section 150 causes the user to select a desired album sample from the information on album samples received from the orderer terminal transmitting section 190. For example, the sample selecting section 150 displays the album samples received from the orderer terminal transmitting section 190 on the display section 170 and causes the user to select a desired album sample. Here, the display 14 is an example of the display 170. Then, when the user selects the desired album sample, the album selecting section 150 provides the layout identification information associated with the album sample in order to uniquely identify the album sample and the image identification information added to the low quality image included in the album sample to the image extracting section 140.

The image extracting section 140 extracts from the high-quality image storage section 110 the high-quality image corresponding to the low quality image included in the album layout generated by the layout information generating section 20 based on the layout information and the layout identification information included in the order identification information received from the orderer terminal receiving section 190. For example, since the image identification information is added to each of the low quality images included in the layout information, the image extracting section 140 extracts the image identification information for each of the low quality images included in the layout information.

Then, the image extracting section 140 extracts the high-quality image corresponding to the extracted image identification information from the high-quality image storage section 110. Additionally, the image extracting section 140 extracts the high-quality image corresponding to the image identification information received from the sample selecting section 150 from the high-quality image storage section 110. The image extracting section 140 provides the extracted high-quality image to the oderer terminal transmitting section 195. Additionally, the image extracting section 140 may provide the layout information and the high-quality image to the display section 170 and cause the display section 170 to display the album. Further, the image extracting section 140 provides the layout information and the high-quality image to the image output section 180.

The image output section 180 outputs the album based on the layout information and the high-quality image received from the image extracting section 140. Specifically, the image output section 180 analyzes the layout information and allocates the high-quality image to the image layout frame at the position at which the high-quality image should be allocated to create data of the album. Then, the image output section 180 outputs the created data of the album. Here, the printer 16 is an example of the image output section 180. The image output section 180 prints the album on a printing medium such as a paper. Additionally, the image output section 180 may record the created album on a recording medium such as a DVD and outputs the same.

When layout information of the album is created, the album orderer terminal 10 according to the present embodiment provides only low quality images to the layout information generating apparatus 20. Therefore, communication traffic between the album orderer terminal 10 and the layout information generating apparatus 20 can be significantly reduced in comparison with the case that high-quality images are provided to the layout information generating apparatus 20. Then, when the album orderer terminal 10 includes any output device such as the printer 16, the album can be printed in the album orderer terminal 10, so that the user can easily print pages of the album in which images are automatically laid out.

FIG. 3 shows an example of functional configuration of the layout information generating apparatus 20 according to the present embodiment. The layout information generating apparatus 20 includes a reception control section 200, a transmission control section 205, a low quality image receiving section 210, a layout information storage section 220, an order identification information transmitting section 230, a sample creating section 240, a sample transmitting section 242, a sample storage section 244 and a layout information generating section 250.

The reception control section 200 receives information provided from the album orderer terminal 10 and the album creating apparatus 30 and provides the received information to a member having a predetermined function, which is included in the layout information generating apparatus 20. Specifically, the reception control section 200 provides the low quality image received from the album orderer terminal 10 or the album creating apparatus 30 to the low quality image receiving section 210. Additionally, receiving layout identification information to identify the album sample from the album creating apparatus 30, the reception control section 200 provides the layout identification information to the sample transmitting section 242. Further, receiving the layout identification information from the album creating apparatus 30, the reception control section 200 provides the layout identification information to the layout information storage section 220.

The low quality image receiving section 210 receives a low quality image obtained by reducing the quality of the high-quality image by the album orderer from the album orderer terminal 10 through the reception control section 200. The low quality image receiving section 210 provides the received low quality image to the layout information generating section 250.

The layout information generating section 250 lays out the low quality images received from the low quality image receiving section 210 in the pages of the album to generate layout information on a low quality image album. The layout information generating section 250 may generate layout information on a plurality of low quality image albums each of which layout of the low quality images received from the low quality image receiving section 210 is different. The layout information generating section 250 may generate layout information on the low quality image album based on image information added to the received low quality image and information obtained by analyzing the content of the low quality image by the layout information generating section 250. Specifically, the layout information generating section 250 may select the low quality image to be laid out in the album based on the theme and taste of the album desired by the user and designer who creates the album and lay out the selected low quality images in the album.

For example, the layout information generating section 250 selects the low quality image appropriate for the theme of the album based on such as lightness, saturation and the distribution of special frequency of the low quality image. Then, the layout information generating section 250 lays out the selected low quality image in the page of the album to create layout information. Here, the layout information includes, in addition to the low quality image laid out in the album, the position, the size and the range of the low quality image laid out in the album, the scaling of the low quality image, the rotation of the low quality image and the image processing such as trimming.

Additionally, the layout information generating section 250, selects as candidates a plurality of low quality images for the image layout frames indicative of the positions at which the low quality images should be laid out in the low quality image album. Then, the layout information generating section 250 may generate layout information on the low quality image album in which each of the plurality of low quality images is fitted into the image layout frame. The layout information generating section 250 provides the generated layout information to the layout information storage section 220.

The layout information storage section 220 receives the layout information generated by the layout information generating section 250 and stores therein the layout information in association with the layout identification information to uniquely identify the layout information. Additionally, the layout information storage section 220 stores therein the layout information in association with the order identification information to identify an order of the album. When the layout information generating section 250 generates plural pieces of layout information, the layout information storage section 220 stores the order identification information including the plural pieces of layout information generated by the layout information generating section 250 and the layout identification information to uniquely identify the plural pieces of layout information, so that a predetermined layout information can be selected only by selecting the layout identification information. The layout information storage section 220 provides the order identification information to the order identification information transmitting section 230 and the sample creating section 240. Additionally, receiving the order identification information from the album creating apparatus 30 through the reception control section 200, the layout information storage section 220 provides the layout information corresponding to the order identification information to the identification information transmitting section 230.

The order identification information transmitting section 230 receives the order identification information stored in the layout information storage section 220 and transmits the same to the album orderer terminal 10 through the transmission control section 205. Here, the order identification information may include the layout information and the layout identification information. Additionally, the order identification information transmitting section 230 provides the layout information received from the layout information storage section 220 to the album creating apparatus 30 through the transmission control section 205.

The sample creating section 240 creates an album sample with the layout indicated by each of the plural pieces of layout information which are generated by the layout information generating section 250 and received from the layout information storage section 220. The sample creating section 240 may create at least an album sample of all the pages of the album, a facing page of the album and the cover of the album. Additionally, the sample creating section 240 associates the created album sample with the layout identification information to uniquely identify the same. The sample creating section 240 may provide the layout identification information to the layout information storage section 220 and store the same in association with the order identification information. The sample creating section 240 provides the created album sample to the sample transmitting section 242 and the sample storage section 244. The sample storage section 244 stores therein the album sample received from the sample creating section 240 in association with the layout identification information. The sample storage section 244 provides the stored album sample to the sample transmitting section 242 based on the instruction from the sample transmitting section.

The sample transmitting section 242 transmits a plurality of album samples created by the sample creating section 240 to the album orderer terminal 10 through the transmission control section 205 and causes the album orderer to view the same. Additionally, receiving information indicating that any album sample is provided from the album orderer terminal 10 or the album creating apparatus 30 through the reception control section 200, the sample transmitting section 242 may extract the album sample corresponding to the information from the sample storage section 244 and transmit the album sample to the album orderer terminal 10 or the album creating apparatus 30 through the transmission control section 205.

The layout information generating apparatus 20 according to the present embodiment receives low quality images from the album orderer terminal 10 or the album creating apparatus 30 and automatically creates the layout information of the album and the album samples based the received low quality images. Therefore, the user does not need not to select the image to be laid out in the album and lay out the image. Thereby it can reduce some works that the user selects the image to be laid out in the album and lays out the image.

FIG. 4 shows an example of functional configuration of the album creating apparatus 30 according to the present embodiment. The album creating apparatus 30 includes a receiving section 300, a transmitting section 305, an order identification information acquiring section 310, a layout information acquiring section 320, an album creating section 300, an album output section 335 and an album creating image storage section 340. Here, the album creating apparatus 30 may include a part of or all of the configuration and the function of the album orderer terminal 10 described above with reference to FIG. 1 and FIG. 2.

The order identification information acquiring section 310 acquires a high-quality image along with the order identification information transmitted by the order identification information transmitting section 230 included in the layout information generating apparatus 20 from the album orderer through the receiving section 300. Specifically, the order identification information acquiring section 310 acquires the order identification information transmitted by the order identification information transmitting section 230 and the high-quality image which are recorded on a recording medium such as a memory by the album orderer through the receiving section 300. For example, the order identification information acquiring section 310 acquires the order identification information and the high-quality image which are recorded on a recording medium such as a semiconductor memory and a magnetic recording medium through the receiving section 300. Here, the order identification information acquiring section 310 may acquire the order identification information and the high-quality images through a network such as LAN, WAN and Internet. Further, the order identification information acquiring section 310 acquires from the album orderer terminal 10 layout identification information to identify the layout information selected among the plural pieces of layout information transmitted by the order identification information transmitting section 230 by the album orderer. The order identification information acquiring section 310 provides the order identification information and the layout identification information to the layout information acquiring section 320. Additionally, the order identification information acquiring section 310 provides the acquired high-quality image to the album creating image storage section 340.

The layout information acquiring section 320 acquires the layout information stored in the layout information storage section 220 in association with the order identification information acquired by the order identification information acquiring section 310. Specifically, the layout information acquiring section 320 transmits the order identification information received from the order identification information acquiring section 310 to the layout information storage section 220 included in the layout information generating apparatus 20 through the transmitting section 305. Then, the layout information acquiring section 320 acquires the layout information in association with the order identification information, which is stored in the layout information storage section 220 from the layout information storage section 220 through the order identification information transmitting section 230, the transmission control section 205 and the receiving section 300.

Additionally, the layout information acquiring section 320 may acquire the plural pieces of layout information stored in the layout information storage section 220 in association with the order identification information acquired by the order identification information acquiring section 310. Further, the layout information acquiring section 320 may acquire the layout information stored in the layout information storage section 220 in association with the layout identification information acquired by the order identification information acquiring section 310. The layout information acquiring section 320 provides the acquired layout information to the album creating section 330. The album creating image storage section 340 stores the high-quality image associated with the layout identification information received from the order identification information acquiring section 310. The album creating image storage section 340 provides the high-quality image to the album creating section 330.

The album creating section 330 lays out the high-quality images acquired by the layout information acquiring section 310 according to the layout information acquired by the layout information acquiring section 320 to create a high-quality image album. Additionally, the album creating section 330 lays out the high-quality images acquired by the order identification information acquiring section 310 according to the layout information selected by the album orderer among the plural pieces of layout information acquired by the layout information acquiring section 320 to create a high-quality image album. Specifically, the album creating section 330 extracts the high-quality image corresponding to the layout information acquired by the layout information acquiring section 320 from the album creating image storage section 340. For example, the album creating section 330 extracts from the album creating image storage section 340 the high-quality image corresponding to the low quality image using the image identification information corresponding to the low quality image included in the layout information on the low quality image album. Then, the album creating section 330 creates an album based on the layout information and the high-quality image received from the album creating image storage section 340. The album creating section 330 provides the created album to the album output section 335.

The album output section 335 outputs the album received from the album creating section 330. For example, the album output section 335 may be a printing device for creating an album. The album output section 335 prints the images laid out in the image layout frames for each page of the album to create the album. Additionally, the album output section 335 may record the album on a recording medium such as a DVD and output the same. Further, the album creating section 335 may provide the album to the album orderer and the album orderer terminal 10 through the transmitting section 305 such as a memory and a network such as Internet.

Creating an album, the album creating apparatus 30 according to the present embodiment receives the layout identification information and a high-quality image through a recording medium such as a memory. Then, the album creating apparatus 30 receives from the layout information generating apparatus 20 the layout information corresponding to the layout identification information read from the storage medium and creates an album based on the layout information and the high-quality image. Therefore, the user can easily and speedily create a desired album only by providing the layout identification information and the high-quality image to the album creating apparatus 30 without selecting any high-quality image to be laid out in the album.

FIG. 5 shows an example of flow of a processing in the album creating system 40 according to the present embodiment. Firstly, the image quality converting section 120 included in the album orderer terminal 10 converts the quality of the high-quality image stored in the high-quality image storage section 110 to create a low quality image in order to reduce an amount of data of the image (S1000). The album orderer terminal 10 provides the generated low quality image to the layout information generating apparatus 20 (S1010). The layout information generating section 250 included in the layout information generating apparatus 20 generates layout information on a low quality image album in which the received low quality image is laid out (S1020). Next, the sample creating section 240 creates an album sample of the layout indicated by the layout information using the low quality image (S1030). Then, the sample creating section 240 associates order identification information to identify an order of the album with the layout information, the layout identification information and the album sample (S1040).

Next, the layout information generating apparatus 20 provides the order identification information, the layout identification information, the layout information and the album sample to the album orderer terminal 10 (S1050). The sample selecting section 150 included in the album orderer terminal 10 causes the user to select a desired album sample (S1060). The album orderer terminal 10 provides the order identification information, the layout identification information associated with the album sample selected by the user and the high-quality image to the album creating apparatus 30 (S1080).

Receiving the order identification information, the layout identification information and the high-quality images from the album orderer terminal 10, the album creating apparatus 30 provides the order identification information and the layout identification information to the layout information generating apparatus 20 and requests to provide layout information corresponding to the layout identification information (S1090). The layout information generating apparatus 20 provides the layout information corresponding to the layout identification information received from the album creating apparatus 30 to the album creating apparatus 30 (S1100). Receiving the layout information from the layout information generating apparatus 20, the album creating apparatus 30 analyzes the layout information, extracts a high-quality image to be allocated to the album among the high-quality images received from the album orderer terminal 10 and allocates the high-quality image to the page of the album to create the album (S1110). For example, the album creating section 330 included in the album creating apparatus 30 reads image identification information added to the low quality image and extracts a high-quality image corresponding to the image identification information from the album creating image storage section 340 to create the album.

According to the album creating system 40 of the present embodiment, layout information on the album can be automatically generated when the album orderer terminal 10 transmits the low quality image to the layout information generating section 20. Then, the generated layout information and layout identification information corresponded to the layout information are transmitted to the album orderer terminal 10. The user can select a desired layout information at the album orderer terminal 10. Then, the layout identification information corresponding to the layout information selected by the user and the high-quality image are provided to the album creating apparatus 30 through a recording medium such as a memory. Then, the album creating apparatus 30 receives the layout information corresponding to the provided layout identification information from the layout information generating apparatus 20 and creates the album based on the layout information and the high-quality image. Thereby the user can easily and speedily a desired album in the album creating apparatus 30 by only providing the layout identification information and the high-quality image without selecting any high-quality image to be laid out in the album.

Additionally, according to the album creating system 40 of the present embodiment, an album sample is automatically created when the album orderer terminal 10 provides a low quality image to the layout information generating apparatus 20. Then, the album sample created by the layout information generating apparatus 20 is transmitted to the album orderer terminal 10. Then, when the user selects a desired album sample, a high-quality image corresponding to the low quality image included in the selected album sample is automatically extracted. Then, the extracted high-quality image is automatically laid out in the image layout frame in the page of the album. Thereby the user does not need to select the image to be laid out in the album and lay out the image, so that the album desired by the user can be speedily created.

FIG. 6 shows an example of flow of a processing in the album creating system 40 according to the present embodiment. Here, each step in FIG. 6 having the reference numeral same as that of each step in FIG. 5 operates substantially the same as each step above-described in FIG. 5, so that the detailed description is omitted.

Firstly, the image quality converting section 120 generates a low quality image by converting the quality of a high-quality image (S1000). The Album orderer terminal 10 provides the generated low quality image to the layout information generating apparatus 20 (S1010). The layout information generating section 250 included in the layout information generating apparatus 20 generates layout information on a low quality image album in which the received low quality image is laid out (S1020). Next, the sample creating section 240 generates an album sample indicated by the layout information by using the low quality image (S1030). Then, the sample creating section 240 associates the order identification information to identify an order of the album with the layout information, the layout identification information and the album sample (S1040).

Then, the layout information generating apparatus 20 provides the order identification information to the album orderer terminal 10 (S1055). The album orderer terminal 10 provides the high-quality image and the order identification information to the album creating apparatus 30 (S1082). The album creating apparatus 30 provides the order identification information received from the album orderer terminal 10 to the layout information generating apparatus 20 and requests to transmit the layout identification information included in the order identification information and the album sample associated with the layout identification information (S1085).

The layout information generating apparatus 20 transmits the layout identification information included in the order identification information received from the album creating apparatus 30 and the album sample corresponding to the layout identification information to the album creating apparatus 30 (S1095). The album creating apparatus 30 presents the album sample provided from the album orderer terminal 10 to the user and causes the user to select the desired album sample (S1105). The Album creating apparatus 30 provides the layout identification information corresponding to the album sample selected by the user to the layout information generating apparatus 20 (S1115).

Receiving the layout identification information from the album creating apparatus 30, the layout information generating apparatus 20 provides the layout information corresponding to the layout identification information to the album creating apparatus 30 (S1120). Then, receiving the layout information, the album creating apparatus 30 extracts the high-quality image corresponding to the low quality image included in the layout information among the high-quality images received from the album orderer terminal 10 and creates the album with the layout corresponding to the layout information using the extracted high-quality image (S1130).

FIG. 7 shows an example of flow of a processing in the album creating system 40 according to the present embodiment. Here, each step in FIG. 7 having the reference numeral the same as that of each step in FIG. 5 and FIG. 6 operates substantially same as each step above-described in FIGS. 5 and 6, so that the detailed description is omitted. Additionally, the album orderer terminal 10 may be the album creating apparatus 30 in the following description with reference to FIG. 7.

Firstly, the image quality converting section 120 included in the album orderer terminal 10 converts the quality of the high-quality image stores in the high-quality image storage section 110 to create a low quality image (S1000). Here, the album orderer terminal 10 is the album creating apparatus 30, the album creating apparatus 30 receives the high-quality image from the album orderer and then, converts the quality of the high-quality image to create a low quality image. The album orderer terminal 10 provides the generated low quality image to the layout information generating apparatus 20 (S1010). The Layout information generating section 250 generates layout information on a low quality image album in which the received low quality image is laid out (S1020). Next, the sample creating section 240 generates an album sample with the layout indicated by the layout information using the low quality image (S1030). Then, the sample creating section 240 associates the order identification information to identify an order of the album with the layout information, the layout identification information and the album sample (S1040).

Then, the layout information generating apparatus 20 provides the layout identification information, the layout information and the album sample to the album orderer terminal 10 (S1050). The sample selecting section 150 included in the album orderer terminal 10 causes the user to select a desired sample (S1060). Then, the image extracting section 140 extracts the high-quality image corresponding the low quality image included in the selected album sample and provides the extracted high-quality image and the layout information received from the layout information generating apparatus 20 to the image output section 180. The image output section 180 analyzes the received layout information and allocates the high-quality image to the page of the album to create the album (S1140).

According to the album creating system 40 of the present embodiment, when the user creates an album, the layout information creating apparatus 20 lays out the album, and the album orderer terminal 10 receives the layout information generated by the layout information generating apparatus 20. Then, the high-quality image stored in the album orderer terminal 10 is laid out based on the layout information to automatically create the album. Therefore, the user does not need to select the image to be laid out in the album and lay out the image, so that the desired album can be easily and speedily created.

FIG. 8 is a schematic diagram showing an album creating system 42 according to another embodiment. The album creating system 42 includes a plurality of album orderer terminals 10, a layout information generating apparatus 20, an album creating apparatus 30 and an image storage section 50. The album orderer terminal 10 may be such as a personal computer, a digital camera with a communication function and a cell-phone unit with an image capturing function. The plurality of album orderer terminals 10 not only order to create an album to the album creating apparatus 30 but also stores in the image storage section 50 low quality images obtained by reducing the quality of the high-quality images included in the album orderer terminals 10 and also low quality images obtained by reducing the quality of the high-quality images captured by the album orderer terminals 10 through a network.

The image storage section 50 stores therein the low quality images received from the plurality of album orderer terminals 10 in association with a provision user ID to identify each of the plurality of album orderer terminals 10. The image storage section 50 also stores information indicating whether the stored low quality images can be provided to users other than the user who provides the low quality images. Additionally, the image storage section 50 stores therein not only the low quality image received from the plurality of album creating terminals 10 but also the low quality images generated from the high-quality image captured by a professional photographer and the low quality image generated from the high-quality image generated by a designer in association with the identification information to identify the photographer and the designer, respectively. In this case, the image storage section 50 may store the low-quality images provided by the photographer and the designer in associated with information indicating that those should be charged.

The layout information generating apparatus 20 receives information on the theme of the album which is desired to create by each user of the album orderer terminal 10 from each of the plurality of album orderer terminals 10 in association with the identification information to identify each of the plurality of album orderer terminals 10. The layout information creating apparatus 20 automatically extracts the low-quality image appropriate for the layout of an album to be created dependent on the received information on the themes of the plurality of albums. Then, the layout information generating apparatus 20 creates a plurality of album samples dependent on the information on the themes of the plurality of albums received from each of the plurality of album orderer terminals 10 in association with the identification information to identify the plurality of album orderer terminals 10, respectively. The layout information generating apparatus 20 transmits the plurality of generated album samples to each of the plurality of album orderer terminals 10.

The album orderer terminal 10 presents the album sample received from the layout information generating apparatus 20 to the user. When the user selects the presented album sample, the album orderer terminal 10 extracts the high-quality image corresponding to the low-quality image included in the album sample. Then, the high-quality image extracted by the album orderer terminal 10 and the layout information on the album sample are provided to the album creating apparatus 30. Thereby the album creating apparatus 30 can create an album desired by the user.

For example, an album orderer terminal 10(B) being a digital camera with a communication function and an album orderer terminal 10 (C) being a cell-phone unit with an image capturing function capture plurality of images. The album orderer terminal 10 (B) generates a low-quality image from the captured image every time the user captures an image by the album orderer terminal 10 (B). Then, the album orderer terminal 10 (B) sequentially stores the generated low-quality images in the image storage section 50 through a network. Meanwhile, the album orderer terminal 10 (C) generates low-quality images from the captured images every time the user captures an image by the album orderer terminal 10 (C). Then, the album orderer terminal 10 (C) sequentially stores the generated low-quality images in the image storage section 50 through a network.

Here, generating a low-quality image, each of the album orderer terminal 10 (B) and the album orderer terminal 10 (C) applies to the low quality image information on the high-quality image corresponding to the low-quality image, such as the image capturing time and date, and the image capturing location of the high-quality image, information indicative of the kind of subject included in the high-quality image and subject information indicative of the position of the subject in the high-quality image and the number of subjects included in the high-quality image. Then, the image storage section 50 stores therein the low-quality image in association with the identifier to identify the album orderer terminal 10 which provides the low-quality image. In this case, the user of the album orderer terminal 10 stores the low-quality image in the image storage section 50 further in association with shared information indicating whether the low-quality image to be stored in the image storage section 50 is used in the other album orderer terminals 10.

Next, for example, the album orderer terminal 10 (B) transmits information indicating that the user of the album orderer terminal 10 (B) desires to create an album with the theme "young generation" to the layout information generating apparatus 20. The layout information generating apparatus 20 extracts the low-quality image corresponding to "young generation" from the image storage section 50. For example, the layout information generating apparatus 20 extracts a low quality image among a plurality of low-quality images, which includes any subject having an age within a predetermined range and of which shared information indicative of being sharable from the image storage section 50. Then, the layout information generating apparatus 20 transmits the generated album sample to the album orderer terminal 10 (B).

The user of the album orderer terminal 10 (B) determines whether the album will be created with reference to the album sample transmitted from the layout information generating apparatus 20. When the user of the album orderer terminal 10 (B) desires to create an album, the album orderer terminal 10 (B) provides the album sample and the high-quality image corresponding to the low-quality image included in the album sample along with the information indicative of creating the album to the album creating apparatus 30. Then, the album creating apparatus 30 automatically creates the album which is desired by the user of the album orderer terminal 10 (B).

According to the album creating system 42 of the present embodiment, the image storage section 50 stores a plurality of low-quality images generated by a plurality of album orderer terminals 10. Therefore, the album orderer terminal 10 can refer the album sample using not only the low-quality image generated by the album orderer terminal 10 but also the low-quality images which are generated by the other album creating terminals 10 and are permitted to share by the other album orderer terminals 10. Thereby an album sample in which the appropriate low-quality images are laid out dependent on the taste for each of the users of the plurality of album orderer terminals 10 can be created to create the album.

FIG. 9 shows an example of data structure of the image storage section 50 according another embodiment. The image storage section 50 further includes a layout information generating apparatus 20, or is communicatively connected to the layout information generating apparatus 20. Then, the image storage section 50 stores therein the low quality image received from each of the plurality of album orderer terminals 10 in association with viewable user identification information to identify any album orderer permitted to view the low-quality image. Specifically, the image storage section 50 stores therein the low-quality image transmitted from the album orderer terminal 10 in association with provision user ID to identify the album orderer who provides the low-quality image. Here, the provision user ID is an example of provision user identification information recited in Claims.

Additionally, the image storage section 50 stores the low-quality image in association with viewable user ID being information to identify any album orderer permitted to view the low-quality images. Here, the viewable user ID is an example of viewable user identification information recited in Claims. Additionally, the image storage section 50 further stores therein the low-quality image in association with information indicative of the kind of subject included in the high-quality image corresponding to the low-quality image, such as information indicating that the subject is an inanimate object, information indicating that the subject is a person, information indicating that the subject is a friend, a family and a co-worker at the office and information indicative of the age of the subject. Further, the image storage section 50 stores therein the low-quality image in association with time and date information indicative of the time and date at which the high-quality image corresponding to the low-quality image is generated.

For example, the image storage section 50 stores therein a low-quality image (#600), the time and date at which the high-quality image corresponding to the low-quality image (#600) is generated, the time and date, and the location at which the high-quality image is captured and a viewable user ID 2000 to identify the album orderer terminal 10 permitting to view the low-quality image (#600) in association with a provision user ID 3000 to identify the album orderer terminal 10 which provides the low-quality image (#600). The image storage section 50 may store a plurality of low-quality images in association with the provision user ID. Then, the image storage section 50 may associate the plurality of viewable user IDs with each of the plurality of stored low-quality images. In the same way, the image storage section 50 stores therein a low-quality image (#610), the time and date at which the high-quality image corresponding to the low-quality image (#610) is generated, the time and date, and the location at which the high-quality image is captured and a viewable user ID 2500 to identify the album orderer terminal 10 permitting to view the low-quality image (#610) in association with a provision user ID 3100 to identify the album orderer terminal 10 which provides the low-quality image (#610).

FIG. 10 shows an example of data structure of the image storage section 50 according to another embodiment. The image storage section 50 further includes a layout information generating apparatus 20, or is communicatively connected to the layout information generating apparatus 20. Then, the image storage section 50 stores therein the low-quality image received from each of the plurality of album orderer terminals 10 by the low-quality image receiving section 210 in association with provision user identification information to identify the album orderer who transmits the low-quality image and a group to which the album orderer identified by the provision user identification information belongs.

Specifically, the image storage section 50 stores the low-quality image transmitted from the album orderer terminal 10 in association with a provision ID to identify the album orderer terminal 10 which provided the low-quality image and a group ID to identify the group to which the album orderer identified by the provision ID belongs. Here, the group means a predetermined classification such as a relative, a family, a brother, a friend, a co-worker at the office, a circle member and a predetermined age range (e.g. young, middle and old age)

For example, the image storage section 50 stores therein a low-quality image (#650), the time and date, and the location at which the high-quality image corresponding to the low-quality image (#650) is captured, and sharable/non-sharable information indicating whether the low-quality image (#650) is permitted to view/use in association with the provision user ID 3000 to identify the album orderer terminal 100 which provides the low-quality image (#650) and a group ID 4000. Here, the image storage section 50 may store a plurality of low-quality images in association with the provision user ID. That is, the low-quality images (#650) provided by the provision user ID 3000 can be used by only any album orderer who belongs to the group identified by the group ID 4000. Additionally, since it indicates that the low-quality image (#650) is sharable, even any album orderer who does not belong to the group identified by the group ID 4000 can use the low-quality images (#650).

Meanwhile, the image storage section 50 stores therein a low-quality image (#670), the time and date, and the location at which the high-quality image corresponding to the low-quality image (#670) is captured, and sharable/non-sharable information indicating whether the low-quality image (#670) is permitted to view/use in association with the provision user ID 3100 to identify the album orderer terminal 100 which provides the low-quality image (#670) and a group ID 4100. That is, the low-quality images (#670) provided by the provision user ID 4100 can be used by any album orderer who belongs to the group identified by the group ID 4100. Additionally, since it indicates that the low-quality image (#650) is not sharable, the album orderer who does not belong to the group identified by the group ID 4100 can not use the low-quality images (#670). Here, the image storage section 50 may store at least a low-quality image in association with one provision user ID and a plurality of group IDs. Additionally, the image storage section 50 may associates sharable/non-sharable information indicating whether the low-quality image can be shared with each of a plurality of album orderers who belong to the group identified by the group ID.

FIG. 11 shows an example of functional configuration of the album orderer terminal 10 according to another embodiment. The album orderer terminal 10 includes a part of or all of the function and configuration of the album orderer terminal 10 described with reference to FIG. 1-FIG. 10. The album orderer terminal 10 includes a kind of album selecting section 102, a kind of album input section 104, a subject information applying section 106, an image selecting section 152 and a display control section 172. Here, the components with the reference numerals the same as those in the album orderer terminal 10 described with reference to FIG. 1-FIG. 10 have substantially the same function as the components described with reference to FIG. 1-FIG. 10, so that the description is omitted.

The subject information applying section 106 applies the image information on the high-quality image received by the image input section 100 to the high-quality image stored in the high-quality image storage section 110 and the low-quality image stored in the low-quality image storage section 112. The subject information applying section 106 may apply the time and date at which the high-quality image is captured to the high-quality image and the low-quality image which is obtained by reducing the quality of the high-quality image. Here, when the high-quality image is a captured image, the subject information applying section 106 may apply the image capturing time and date, and image capturing location of the captured image, information indicative of the kind of the subject included in the high-quality image, the position of the subject in the high-quality image and the image information indicative of the number of subjects included in the high-quality image to the high-quality image and the low-quality image. Specifically, the subject information applying section 106 applies the image information to the high-quality image and the low-quality image which is generated by reducing the quality of the high-quality image by the image quality converting section 120 during processing by the image identification information applying section 130.

The kind of album selecting section 102 causes the user to select the kind of album which is desired to create by the user of the album orderer terminal 10. Here, the kind of album is information indicative of the characteristic of the high-quality image to be laid out in the album which is desired to create by the user. For example, the kind of album selecting section 102 causes the display section 107 to display text data of a family, brothers and sisters, a friend and a co-worker at the office and causes the user to select among the family, the brothers and sisters, the friend and the co-worker at the office to create the high-quality image album.

Specifically, the kind of album selecting section 102 provides information indicative of a plurality of kinds of album to the display control section 172 and causes the display section 170 to display the plurality of kinds of album. Then, the kind of album input section 104 causes the user to input the kind of album which is desired to create by the user. Next, the kind of album input section 104 provides information indicative of the kind of album inputted by the user to the kind of album selecting section 102. The kind of album selecting section 102 provides the information indicative of the kind of album selected by the user to the orderer terminal transmitting section 195. The orderer terminal transmitting section 195 transmits the information indicative of the kind of album received from the kind of album selecting section 102 to the layout information generating apparatus 20. Thereby the layout information generating apparatus 20 can read the information indicative of the kind of album received from the album orderer terminal 10 and automatically extract a low-quality image appropriate for the album indicated by the information on the kind of album from the image storage section 50.

The display control section 172 causes the display section 170 to display a plurality of album samples transmitted by the sample transmitting section 242 included in the layout information generating apparatus 20. The display section 170 displays the plurality of album samples according to the control of the display control section 172. Specifically, the orderer terminal receiving section 190 receives the plurality of album samples transmitted from the sample transmitting section 242. Then, the orderer terminal receiving section 190 provides the plurality of album samples which have been received to the display control section 172 through the sample selecting section 150. Next, the display control section 172 causes the display section 170 to display the plurality of album samples.

Additionally, The display control section 172 causes the display section 170 to display the album samples transmitted by the sample transmitting section 242 such that any of the plurality of low-quality images selected as the candidate for an image layout frame is displayed at the position of the image layout frame. Specifically, the layout information generating section 250 associates a plurality of low-quality images with each of the plurality of image layout frames included in a plurality of pages in the album sample as the candidate. The display control section 172 controls the display section 170 to selectively display the plurality of low-quality images at the position of the image layout frame.

Additionally, the image selecting section 152 causes the user to select a desired image layout frame and low-quality image among the plurality of image layout frames displayed on the display section 170 by the display control section 172 and the plurality of low-quality images displayed on the display section 170 by the display control section 172. Then, when a low-quality image among the album sample displayed on the display section 170 is selected, the image extracting section 140 extracts a high-quality image corresponding to the selected low-quality image and causes the display section 170 to display the same. Specifically, the image extracting section 140 extracts the high-quality image from the high-quality image storage section 110 using the image identification information on the low-quality image selected by the user according to the image selecting section 152.

For example, when the user selects the image layout frame of the page in the album, the display control section 172 causes the display section 170 to display the plurality of low-quality images associated with the image layout frames designated by the user with a list screen. Additionally, the display control section 172 may cause the display section 170 to display the plurality of low-quality images with a pulldown screen. Then, the image selecting section 152 causes the user to select a desired low-quality image to be laid out in the image layout frame among the plurality of low-quality images displayed on the list screen by the display section 170. The image selecting section 152 provides the image identification information of the low-quality image selected by the user to the image extracting section 140. The image extracting section 140 extracts the high-quality image identified by the image identification information received from the image selecting section 152 from the high-quality image storage section 110. Then, the image extracting section 140 provides the extracted high-quality image to the display control section 172, the image output section 180 and the orderer terminal transmitting section 195.

In this case, the display control section 172 may cause the display section 170 to display the high-quality image received from the image extracting section 140 and also display the high-quality image at least of which part is zoomed according to the instruction of the user. That is to say, the display control section 172 may have a zoom display function for zooming the high-quality image and displaying the same on the display section 170.

Thereby the album sample with the low-quality images can be referred when the user refers the whole of the album sample. Therefore, the user can quickly refer the album sample even if the drawing process of the display section 170 is slow. Additionally, when the user desires to check the minute detail of one low-quality image among the plurality of low-quality images, the high-quality image corresponding to the desired low-quality image is displayed and at least a part of the high-quality image can be zoomed and displayed to check the minute detail.

FIG. 12 shows an example of functional configuration of a layout information generating apparatus 20 according to another embodiment. The layout information generating apparatus 20 includes a part of or all of the function and the configuration of the layout information generating apparatus 20 described above with reference to FIG. 1-FIG. 11. Then, the layout information generating apparatus 20 further includes a low-quality image extracting section 215 the components with the reference numerals the same as those in the layout information generating apparatus 20 described with reference to FIG. 1-FIG. 1 have substantially same function of the components described with reference to FIG. 1-FIG. 11, so that the description is omitted.

Receiving an order of the album from a specified album orderer, the low-quality image extracting section 215 extracts the low-quality image stored in the image storage section 50 in association with viewable user identification information. Additionally, receiving an order of the album from a specified album orderer, the low-quality image extracting section 215 extracts the low-quality image stored in the image storage section 50 in association with provision user identification information to identify the album orderer who belongs to a group the same as that of the specified album orderer. Further, the low-quality image extracting section 215 extracts the low-quality image stored in the image storage section 50 in association with time and date information indicative of a time and date within a predetermined period lapsed from the time and date indicated by the time and date information stored in the image storage section 50 in association with the low-quality image provided from a specified album orderer.

The low-quality image extracting section 215 extracts a plurality of low-quality images stored in the image storage section 50 by using the information indicative of the kind of album, which is received from the album orderer terminal 10 by the reception control section 200. Specifically, the low-quality image extracting section 215 refers information indicative of the kind of subject included in the high-quality image corresponding to the low-quality image, which is stored in the image storage section 50 in association with the low-quality image and extracts the low-quality image appropriate for the kind of album. For example, the image storage section 50 stores the low-quality image received from the album orderer terminal 10 identified by a provision user ID in association with the provision user ID. Then, the image storage section 50 stores the provision user ID further in association with the viewable user ID.

Here, the reception control section 200 further receives the viewable user ID to identify the album orderer of the album orderer terminal 10 which has transmitted information indicative of the kind of album from the album orderer terminal 10 and provides the same to the low-quality image extracting section 215. The low-quality image extracting section 215 extracts the low-quality image with which the viewable user ID received from the reception control section 200 is associated and which is conformed to the information indicative of the kind of album among the low-quality images stored in the image storage section 50. The low-quality image extracting section 215 provides the low-quality image extracted from the image extracting section 50 to the layout information generating section 250.

The layout information generating section 250 generates layout information on a low-quality image album in which the low-quality image extracted by the low-quality image extracting section 215 is laid out. Additionally, receiving a moving as the low-quality image from the low-quality image receiving section 210 or the low-quality image extracting section 215, the layout information generating section 250 may generate a still image with a high-resolution and generate layout information by using the generated still image with a high-resolution. For example, the layout information generating section 250 extracts the predetermined number of frame images at a predetermined interval as frame images for a still image with a high-resolution from a plurality of frames constituting the moving image being a low-quality image. Then, the layout information generating section 250 generates a still image with a high-resolution by an interpolation technique using the plurality of extracted frame images for a still image with a high-resolution.

The layout information generating section 250 may extract the frame image which meets a predetermined criteria among the low-quality images and use the extracted frame image to generate layout information. For example, the layout information generating section 250 may analyze each of the plurality of frame images and use the frame image of which special frequency component is higher than a predetermined threshold value, in which the area ratio of the subject thereto is larger than the predetermined threshold to create the layout information. Additionally, the layout information generating section 250 may apply different image processings to the area of the main subject included in the moving image (such as a subject within a predetermined range from the center of the frame image) and the region of the background except for the main subject.

For example, the layout information generating section 250 analyzes a plurality of continuous frame images and extracts the region of the main subject from each of the plurality of continuous frame images. For example, the layout information generating section 250 extracts the region of the main subject and the region of the background from the difference among the plurality of frame images. Then, the layout information generating section 250 generates a still image with a high resolution of the region of the main subject by the interpolation technique. Next, the layout information generating section 250 applies an image processing to a partial image of the frame image of the extracted background region and combines the partial image with the generated sill image in the region of the main subject. The image processing which is applied to the partial image of the frame image of the extracted background region by the layout information generating section 250 is an image processing to emphasize the motion of the main subject, such as a shading processing on the partial image of the frame image of the background region.

Additionally, extracting the region of the main subject and the region of the background from the difference among the plurality of frame images constituting the moving image being the low-quality image, the layout information generating section 250 may calculate a moving speed of the region of the main subject based on the moving distance of the main subject included in each of the plurality of frame image from the frame image and the time at which each of the plurality of frame images is captured. Then, when the moving speed calculated by the layout information generating section 250 is more than a predetermined value, the layout information generating section 250 generates a composite frame image in which the partial image in the main subject region included in each of the plurality of frame images is arranged in one frame in order of time by using the partial image of the main subject region included in each of the plurality of frame images. Thereby a frame image having the retained image of the main subject can be created. The layout information generating section 250 provides layout information generated using the still image with a high-resolution and the composite frame image which have been generated to the layout information storage section 220.

FIG. 13 shows a display example of a display section 170 according to another embodiment. The kind of album selecting section 102 provides information indicative of a plural kinds of album to the display control section 172 and causes the display section 170 to display the plural kinds of album. For example, the kind of album selecting section 102 causes the display section 170 to display text data such as "default", "family", "brother and sister" and "photographer A (having a charge)". When the user inputs the kind of album which is desired to create from the kind of album input section 104, the kind of album selecting section 102 transmits the information indicative of the kind of album selected by the user to the layout information generating apparatus 20 through the orderer terminal transmitting section 195.

Here, the priority of the low-quality images used to create an album sample is following order: a low-quality image generated by reducing the quality of the high-quality image obtained by the album orderer terminal 10; a low-quality image corresponding to the kind of album inputted to the kind of album input section 104 by the user, which is stored in the image storage section 50; and a low-quality image captured or created by a photographer or a designer, which is stored in the image storage section 50.

FIG. 14 shows an example of flow of a processing in an album creating system 40 according to another embodiment. Here, each step in FIG. 14 having the reference numeral same as that of each step in FIG. 5 operates substantially same as each step above-described in FIG. 5, so that the detailed description is omitted.

firstly, an image quality converting section 120 included in an album orderer terminal 10 converts the quality of the high-quality image stored in the high-quality image storage section 110 to create a low-quality image in order to reduce an amount of data of the image (S1000). The Album orderer terminal 10 provides the created low-quality image to the layout information generating apparatus 20 (S1010). The layout information generating section 250 included in the layout information generating apparatus 20 generates layout information on a low-quality image album in which the received low-quality image is laud out (S1020). Next, the sample creating section 240 generates an album sample indicated by the layout information by using the low-quality image (S1030). Then, the sample creating section 240 associates the order identification information to identify an order of the album with the layout information, the layout identification information and the album sample (S1040).

Next, the layout information generating apparatus 20 provides the order identification information, the layout identification information and the layout information to the album orderer terminal 10 (S1049). Further, the layout information generating apparatus 20 provides album sample information including identification information to identify a plurality of low-quality images to be laid out in each of a plurality of image layout frames included in a plurality of album pages in the album sample to the album orderer terminal 10 (S1049). The orderer terminal receiving section 190 provides the album sample information to the image extracting section 140. The image extracting section 140 extracts the plurality of corresponded low-quality images from the low-quality image storage section 112 with reference to the identification information to identify the plurality of low-quality images included in the album sample information (S1051).

Then, the image extracting section 140 provides the plurality of extracted low-quality images to the display control section 172. The display control section 172 allocates the plurality of low-quality images received from the image extracting section 140 to each of the plurality of pages of the album sample indicated by the layout information and causes the display section 170 to display the same (S1053). Here, when the user instructs to zoom and display at least a part of the album sample (S1055: Yes), the display control section 172 displays the high-quality image corresponding to the low-quality image including the part designated by the user (S1057). Next, the image selecting section 152 causes the display section 170 to sequentially display the low-quality images associated with the image layout frames included in the album page and causes the user to select a desired low-quality image (S1059).

Then, the sample selecting section 150 included in the album orderer terminal 10 causes the user to select a desired album sample (S1060). The Album orderer terminal 10 provides the order identification information, the layout information associated with the album sample selected by the user and the high-quality image to the album creating apparatus 30 (S1080). Receiving the order identification information, the layout identification information and the high-quality image from the album orderer terminal 10, the album creating apparatus 30 provides the order identification information and the order layout identification information to the layout information generating apparatus 20 and requests to provide the layout information corresponding to the layout identification information (S1090).

The layout information generating apparatus 20 provides the layout information corresponding to the layout identification information received from the album creating apparatus 30 to the album creating apparatus 30 (S1100). Receiving the layout information from the layout information generating apparatus 20, the album creating apparatus 30 analyzes the layout information, extracts the high-quality image to be allocated to the album among the high-quality images received from the album orderer terminal 10 and allocates the high-quality image to the page of the album to create the album (S1110). For example, the album creating section 330 included in the album creating apparatus 30 reads the image identification information applied to the low-quality image included in the layout information and extracts the high-quality image corresponding to the image identification information from the album creating image storage section 340 to create the album.

FIG. 15 shows an example of the hardware configuration of the album creating system 40. The album creating systems 40 includes a CPU periphery having a CPU 1505, a RAM 1520, a graphic controller 1575 and a display 1580 which are connected through a host controller 1582 each other, an input/output unit having a communication interface 1530, a hard disk drive 1540 and a CD-ROM drive 1560 which are connected to the host controller 1582 through an input/output controller 1584 and a legacy input/output unit having a ROM 1510, a flexible disk drive 1550 and an input/output chip 1570 which are connected to the input/output controller 1584.

The host controller 1582 connects the RAM 1520 to the CPU 1505 and the graphic controller 1575 which access the RAM 1520 with a high transfer ratio. The CPU 1505 operates according to the programs stored in the ROM 1510 and the RAM 1520 to control each unit. The graphic controller 1575 obtains image data generated on a frame buffer provided in the RAM 1520 by the CPU 1505 and displays the same on the display 1580. Alternatively, the graphic controller 1575 may include therein a frame buffer for storing image data generated by the CPU 1505.

The input/output controller 1584 connects the host controller 1582 to the hard disk drive 1540, the communication interface 1530 and the CD-ROM drive 1560 which are relatively high-speed input/output units. The communication interface 1530 communicates with the other units through a network. The hard disk drive 1540 stores the program and data used by the CPU 1505 in the album creating system 40. The CD-ROM drive 1560 reads the program or data from the CD-ROM 1595 and provides the same to the hard disk drive 1540 through the RAM 1520.

The ROM 1510, and the flexible disk drive 1550 and input/output chip 1570 which are relatively low-speed input/output units are connected to the input/output controller 1584. The ROM 1510 stores a boot program executed by the album creating system 40 at activating and a program depending on the hardware of the album creating system 40. The flexible disk drive 1550 reads the programs or data from a flexible disk 1590 and provides the same to the hard disk drive 1540 through the RAM 1520. The input/output chip 1570 connects various input/output units through the flexible disk drive 1550 and such as a parallel port, a serial port, a keyboard port and a mouse port.

The album creating program provided to the hard disk drive 1540 through the RAM 1520 is stored in a recording medium, such as the flexible disk 1590, the CD-ROM 1595, or an IC card and provided by the user. The album creating program is read from the recording medium, installed onto the hard disk drive 1540 in the album creating system 40 through the RAM 1520 and executed by the CPU 1505. The album creating program installed onto the album creating system 40 and executed therein operates the CPU 1505 to function the image input section 100, the kind of album selecting section 102, the kind of album input section 104, the subject information applying section 106, the high-quality image storage section 110, the low-quality image storage section 112, the image quality converting section 120, the image identification information adding section 130, the image extracting section 140, the sample selecting section 150, the image selecting section 152, the display section 170, the display control section 172, the image output section 180, the orderer terminal receiving section 190, the orderer terminal transmitting section 195, the reception control section 200, the transmission control section 205, the low-quality image receiving section 210, the low-quality image extracting section 215, the layout information storage section 220, the order identification information transmitting section 230, the sample generating section 240, the sample transmitting section 242, the sample storage section 244, the layout information generating section 250, the receiving section 300, the transmitting section 305, the order identification information acquiring section 310, the layout information acquiring section 320, the album creating section 330, the album output section 335 and the album creating image storage section 340 as the album creating system 40 described with reference to FIG. 1-14.

While the present invention has been described with the embodiment, the technical scope of the invention not limited to the above described embodiment. It is apparent to persons skilled in the art that various alternations and improvements can be added to the above-described embodiment. It is apparent from the scope of the claims that the embodiment added such alternation or improvements can be included in the technical scope of the invention.

BRIEF DESCRIPTION OF THE DRAWINGS

FIG. 9 shows a data structure of the image storage section 50;

FIG. 10 shows a data structure of the image storage section 50;

FIG. 13 shows a display example of the display section 170

Figure 1:
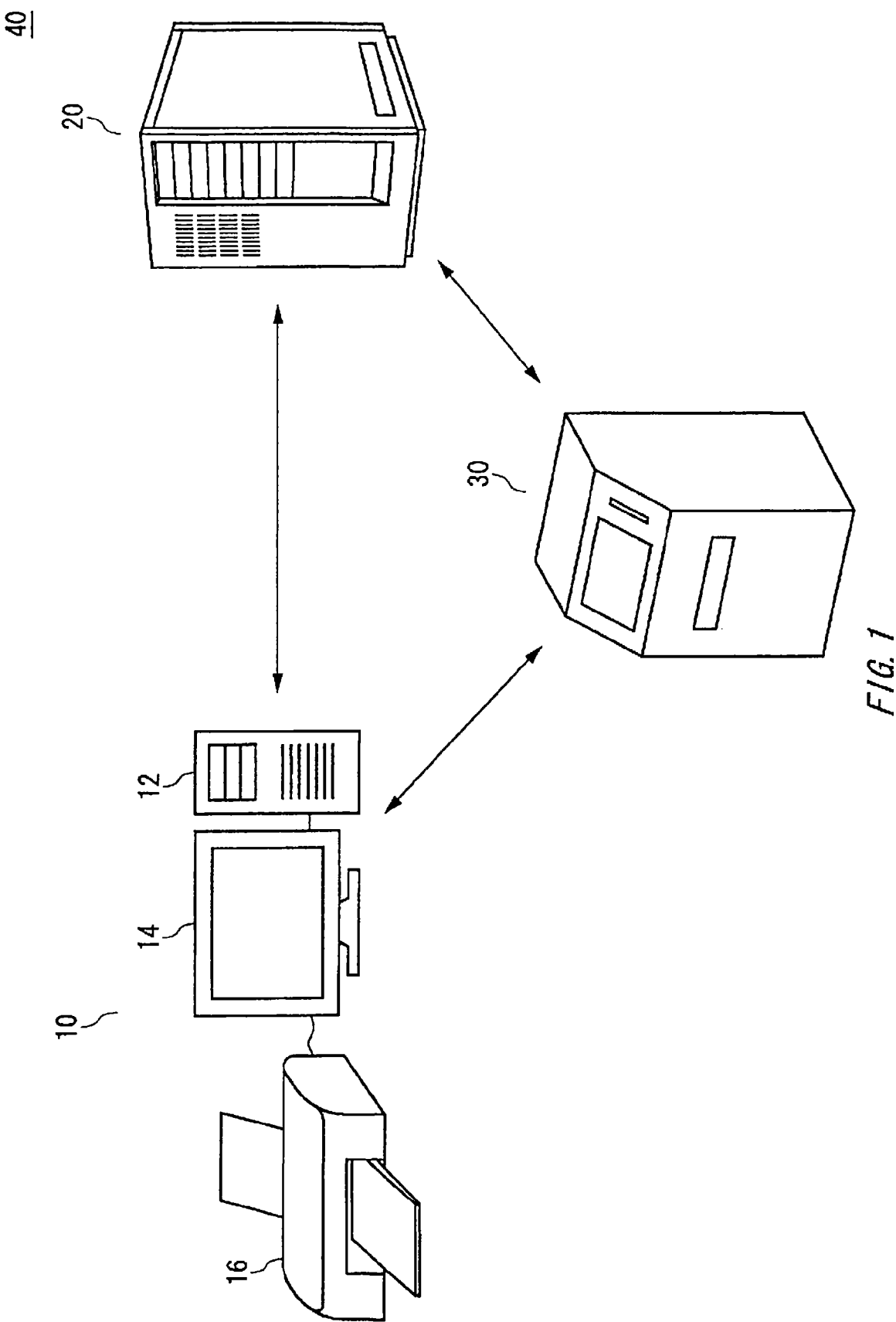
FIG. 1 is a schematic diagram of the album creating system 40.
Figure 2:
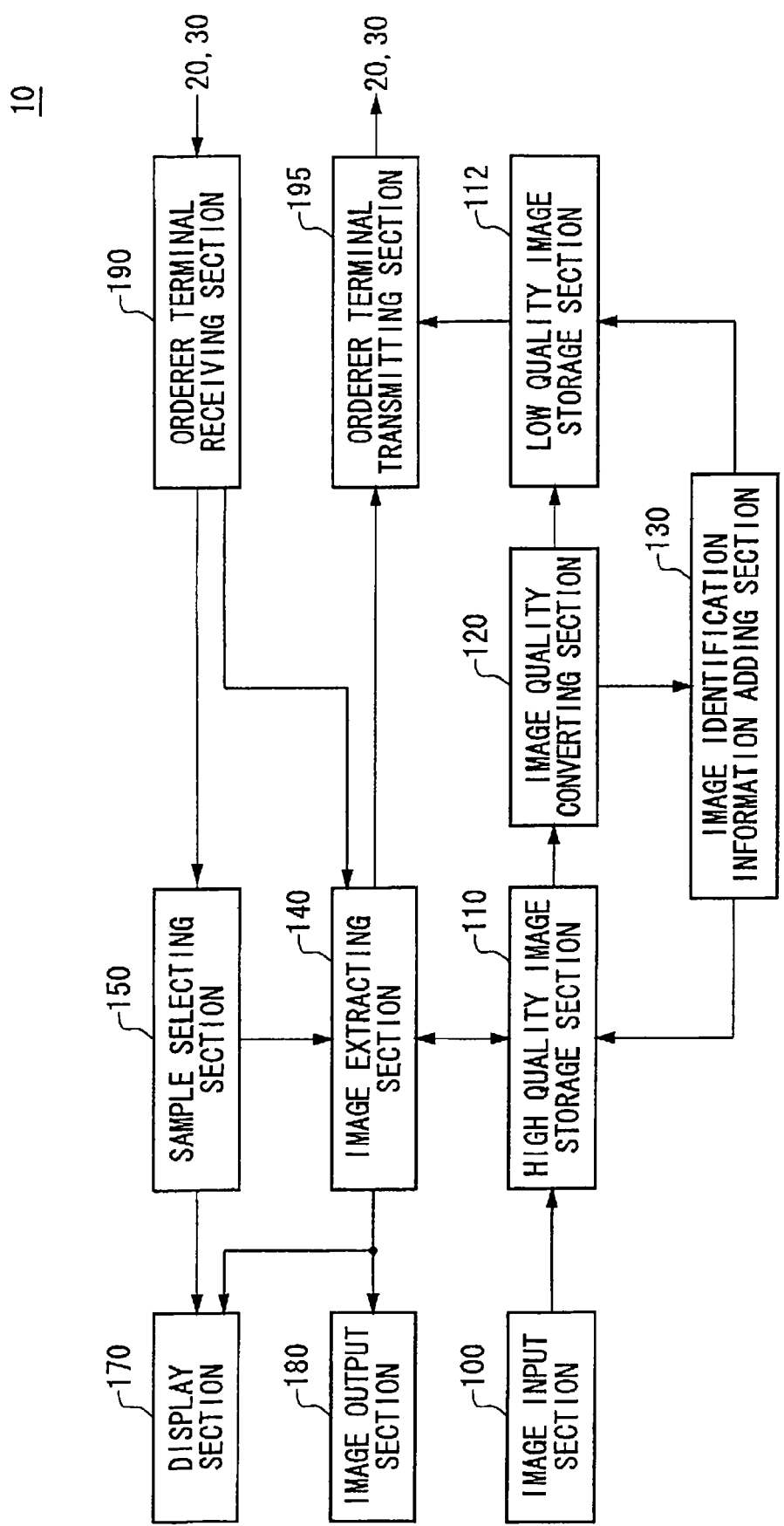
FIG. 2 is a block diagram showing a functional configuration of the album orderer terminal 10.
Figure 3:
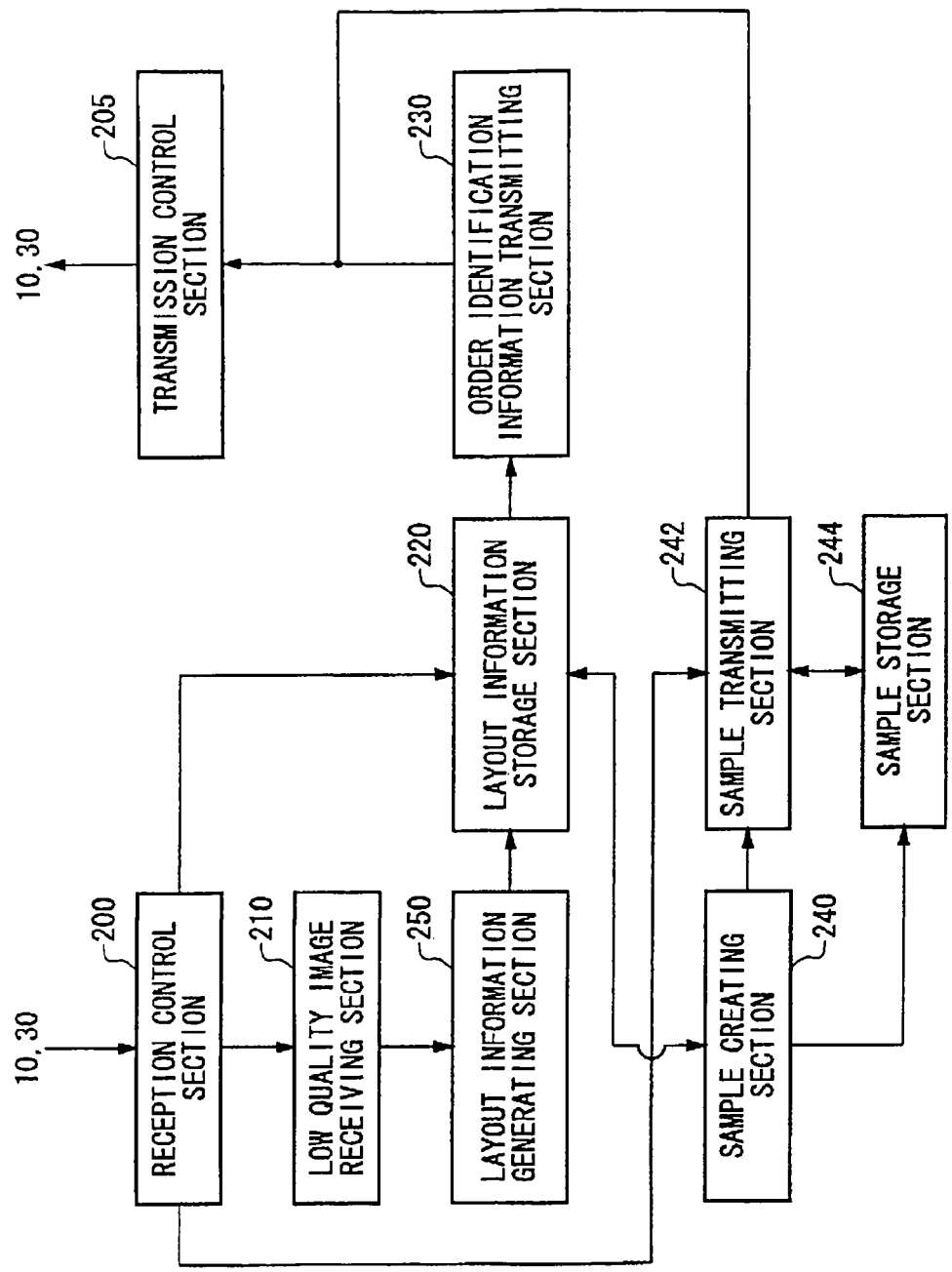
FIG. 3 is block diagram showing a functional configuration of the layout information generating apparatus 20.
Figure 4:
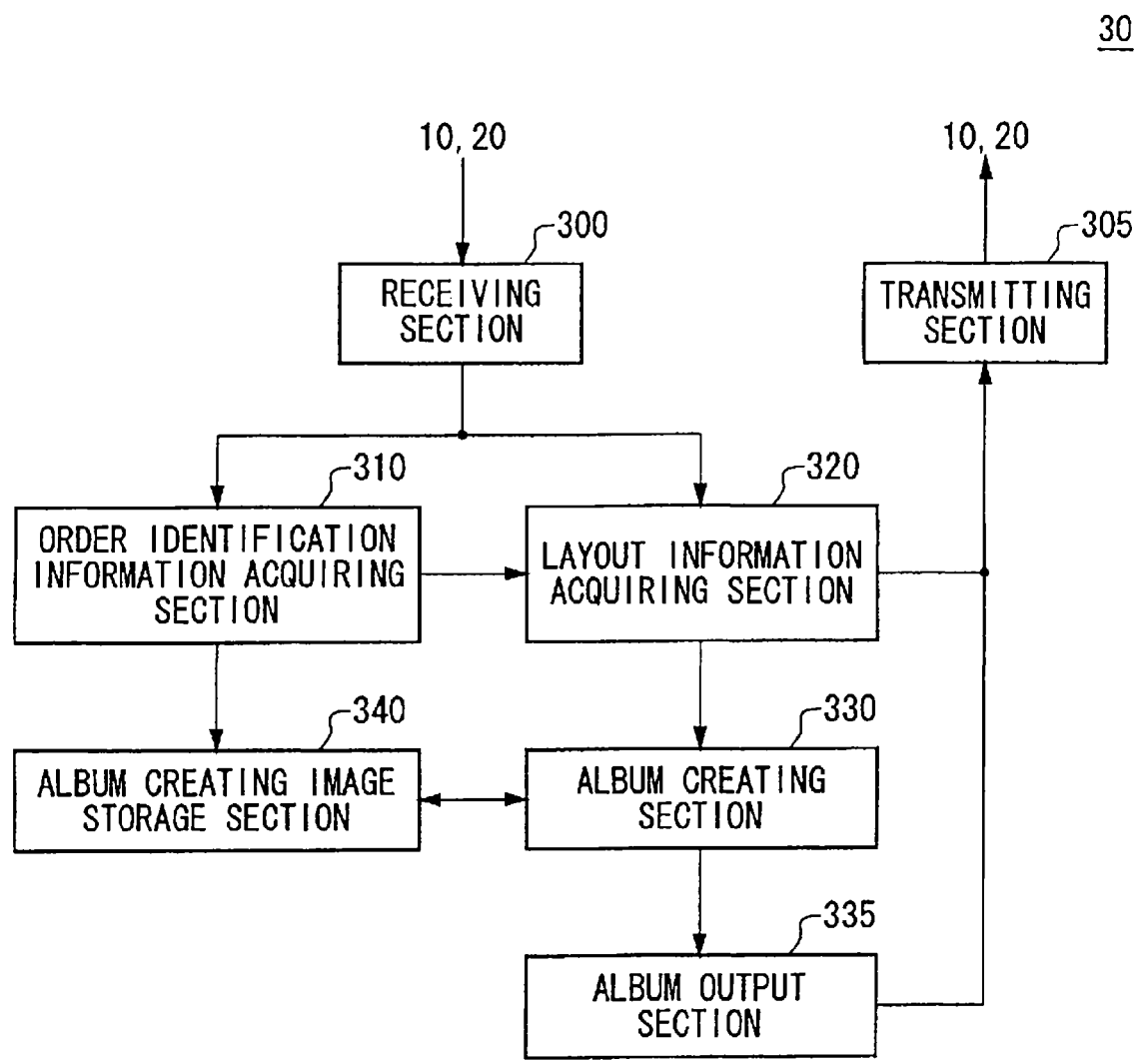
FIG. 4 is block diagram showing a functional configuration of the album creating apparatus 30.
Figure 5:
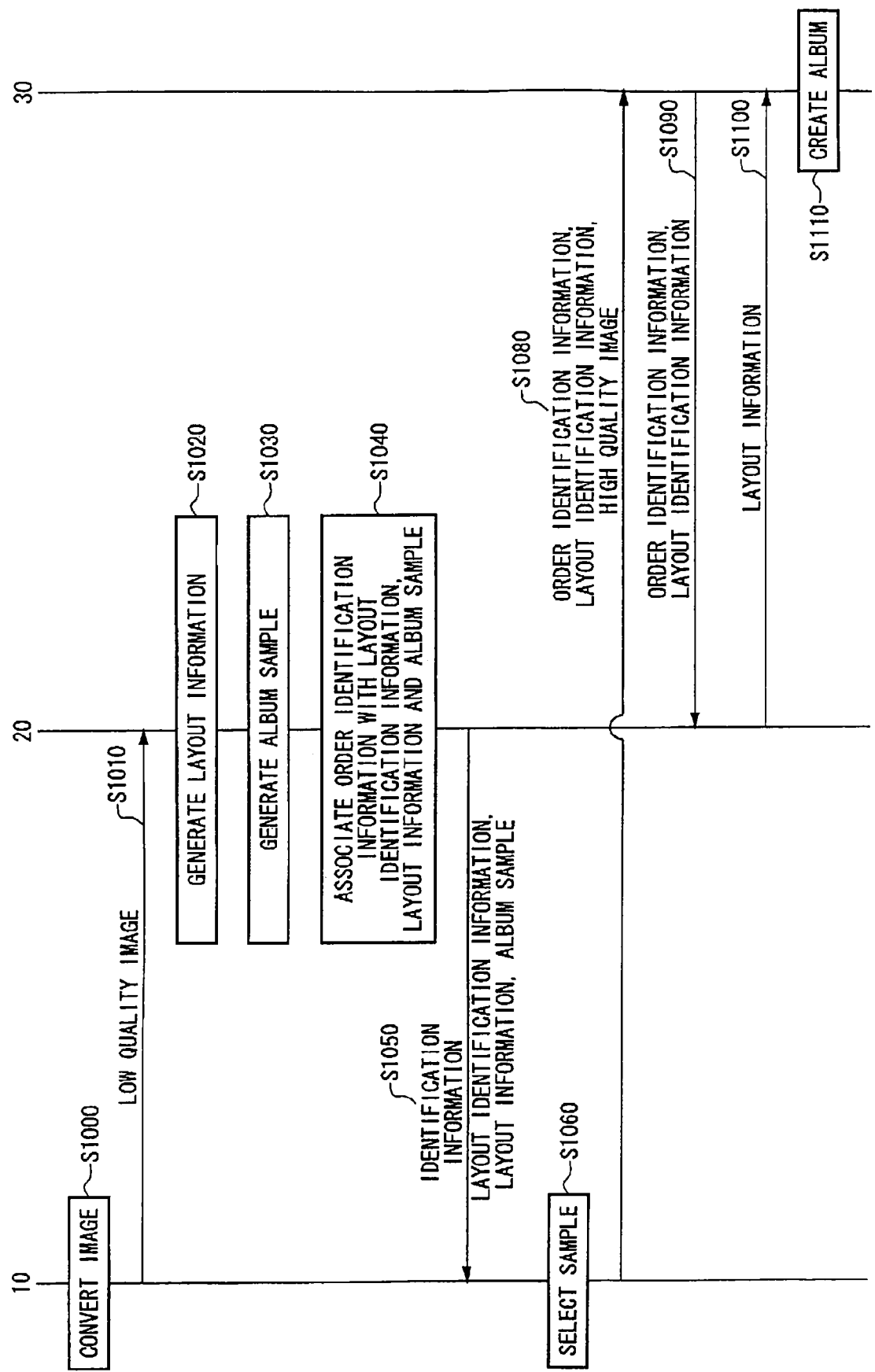
FIG. 5 is a sequence diagram showing a flow of processing of the album creating system 40.
Figure 6:
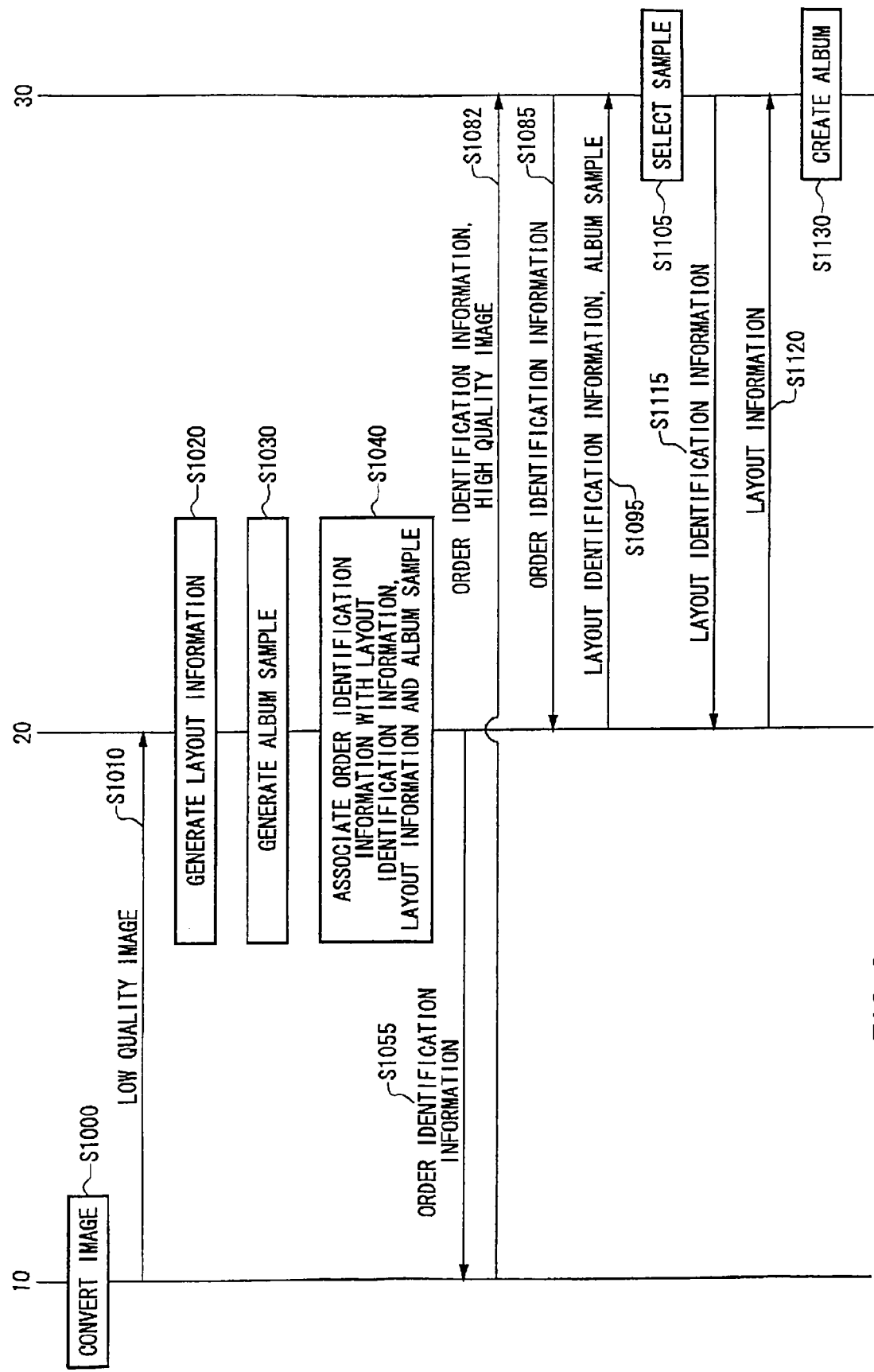
FIG. 6 is a sequence diagram showing a flow of processing of the album creating system 40.
Figure 7:
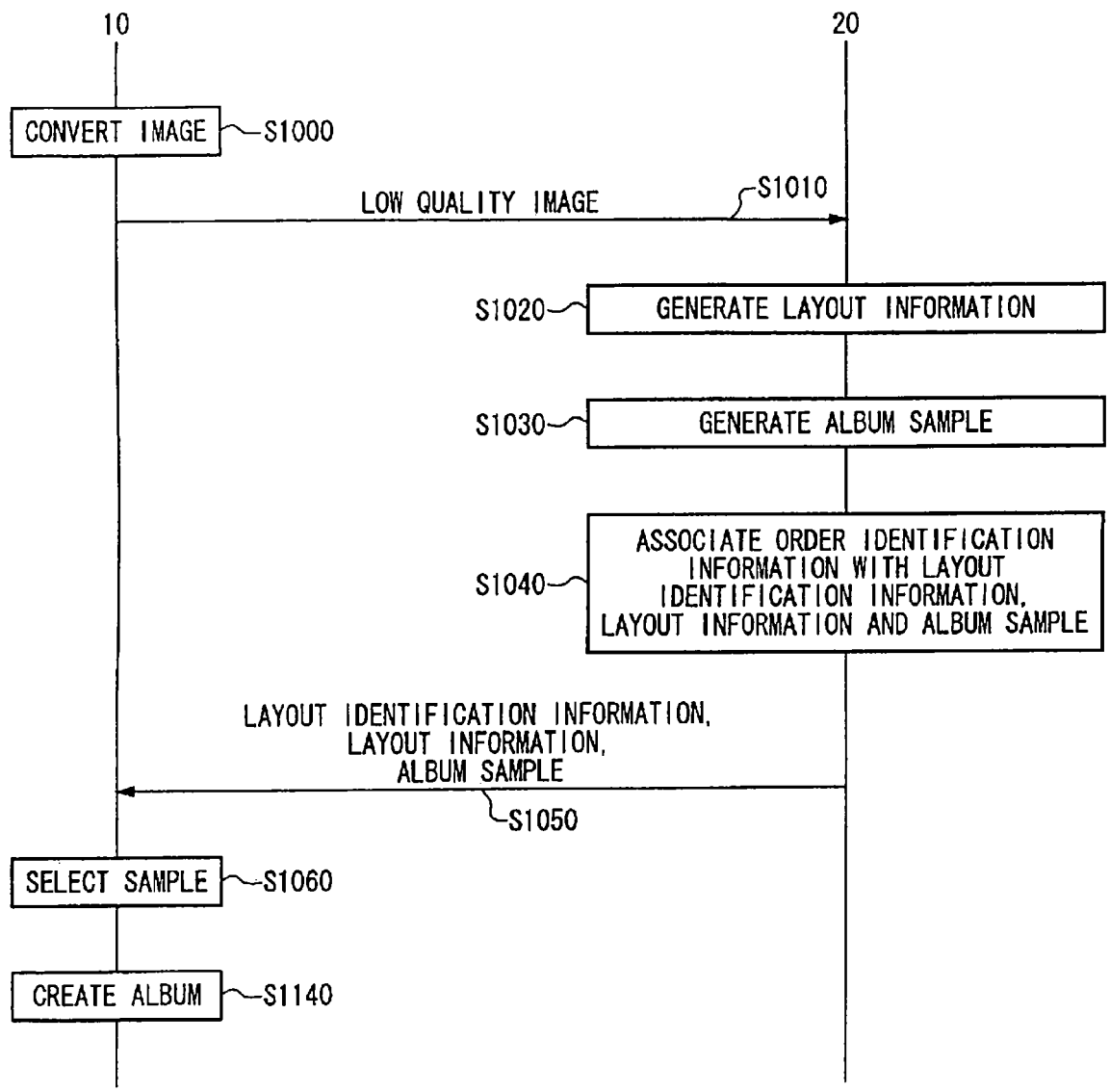
FIG. 7 is a sequence diagram showing a flow of processing of the album creating system 40.
Figure 8:
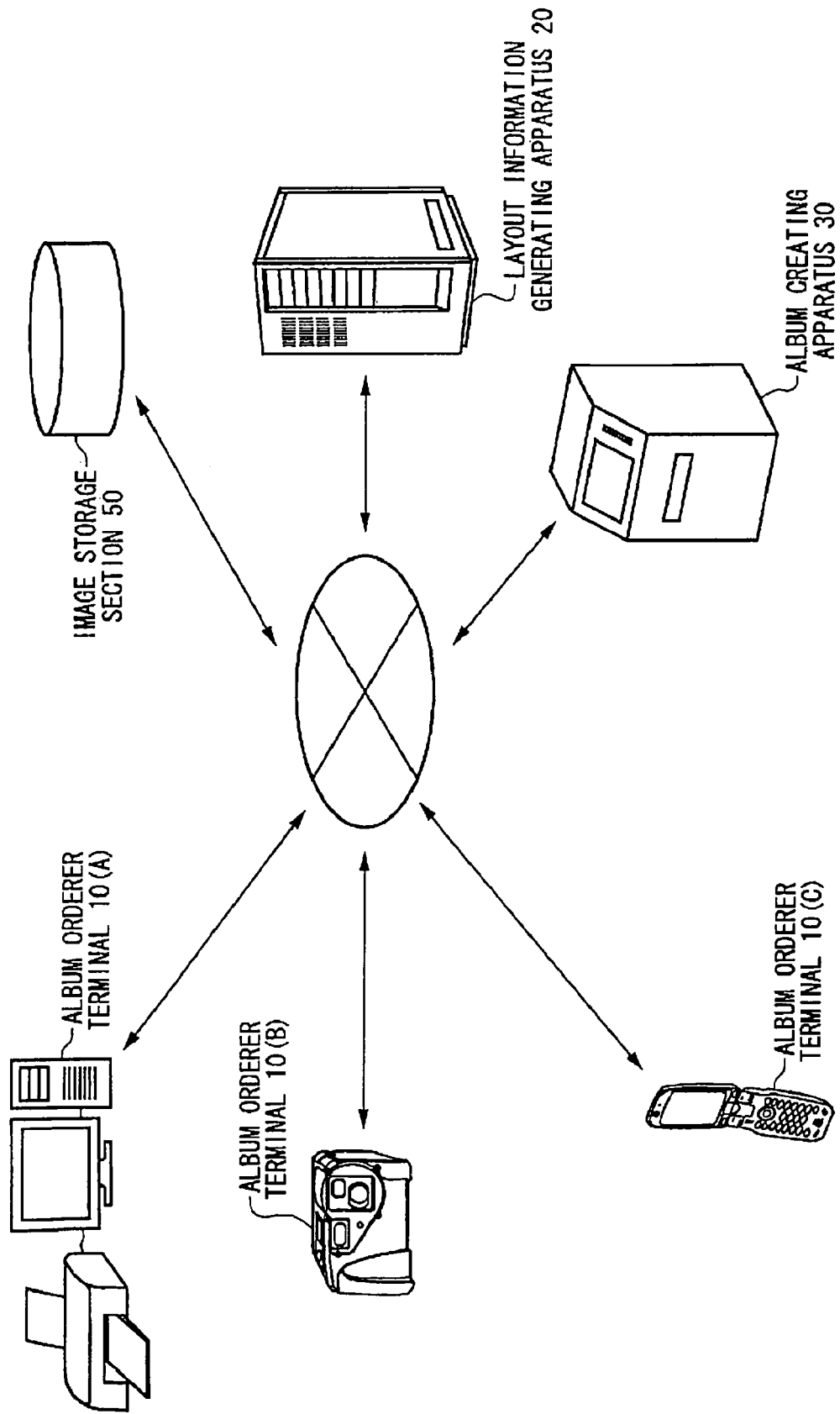
FIG. 8 is a schematic diagram of the album creating system 42.
Figure 11:
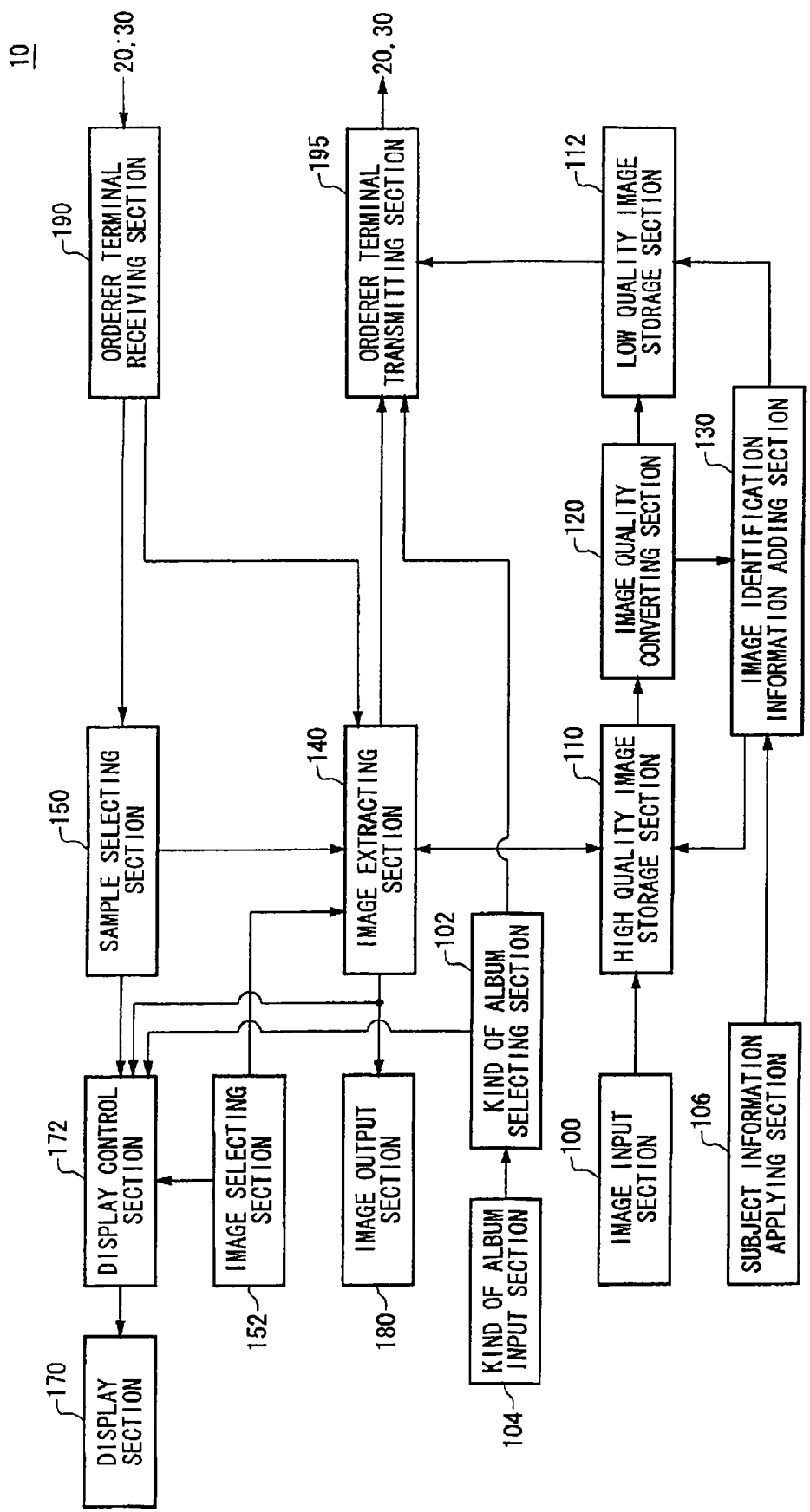
FIG. 11 is a block diagram showing a functional configuration of the album orderer terminal 10.
Figure 12:
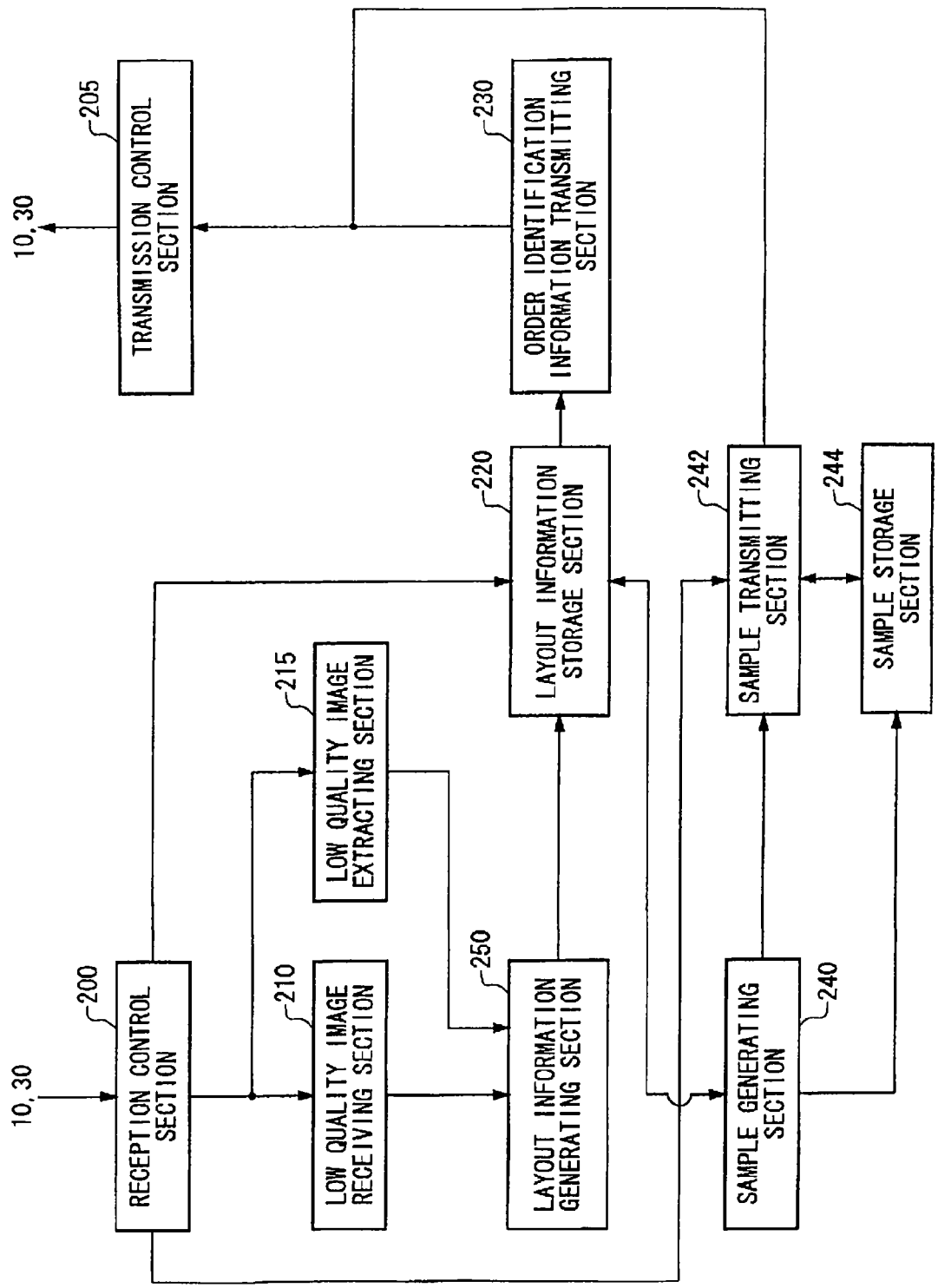
FIG. 12 is block diagram showing a functional configuration of the layout information generating apparatus 20.
Figure 14:
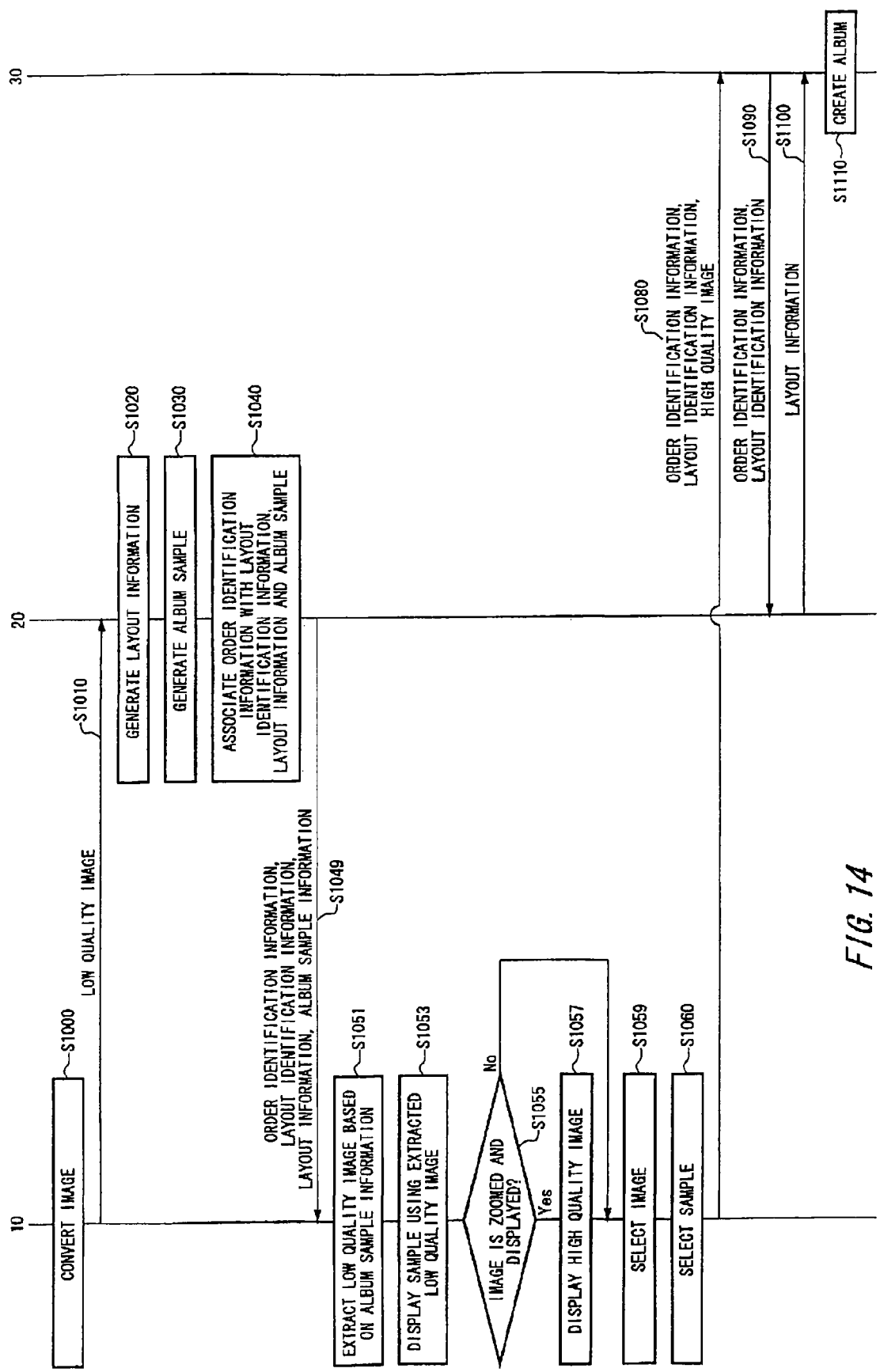
FIG. 14 is a sequence diagram showing a flow of processing of the album creating system 40.
Figure 15:
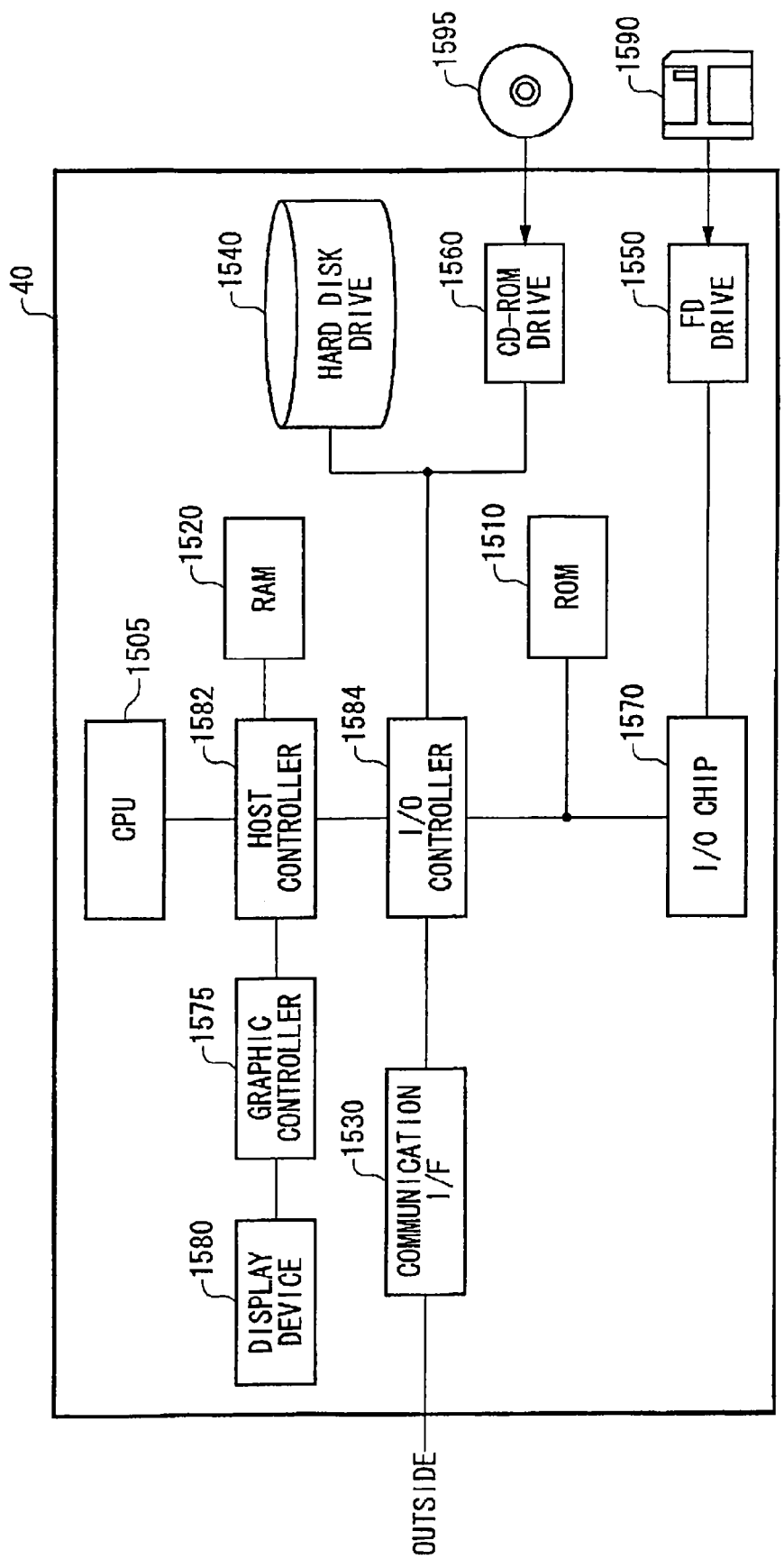
FIG. 15 is a block diagram showing a hardware configuration of the album creating system 40.

The invention claimed is:

1. An album creating system for creating an album using an image provided from an album orderer, comprising:
   a layout information generating apparatus for receiving only a low-quality image from an album orderer terminal via network and generating layout information on the album; and
   an album creating apparatus for creating the album according to the layout information generated by the layout information generating apparatus, wherein
   the layout information generating apparatus including:
   a low-quality image receiving section for receiving the low-quality image obtained by reducing the quality of a high-quality image by the album orderer from the album orderer terminal;
   a layout information generating section for generating layout information of a low-quality image album in which the low-quality image received by the low-quality image receiving section is laid out;
   a layout information storage section for storing therein the layout information generated by the layout information generating section in association with order identification information to identify an order of the album; and
   an order identification information transmitting section for transmitting the order identification information stored in the layout information storage section to the album orderer terminal,
   the album creating apparatus including:
   an order identification information acquiring section for acquiring a high-quality image corresponding to the low-quality image laid out in the low-quality image album by the layout information generating section along with the order identification information transmitted by the order identification information transmitting section;

a layout information acquiring section for acquiring the layout information stored in the layout information storage section in association with the order identification information acquired by the order identification information acquiring section; and an album creating section for creating a high-quality image album by laying out the high-quality image acquired by the order identification information acquiring section according to the layout information acquired by the layout information acquiring section, wherein the low-quality image receiving section and the order identification information acquiring section are configured as two separate units.

2. The album creating system as set forth in claim 1, wherein the layout information generating apparatus further including:

a sample creating section for creating an album sample having a layout indicated by each of the plural pieces of layout information generated by the layout information generating section; and a sample transmitting section for transmitting a plurality of album samples created by the sample creating section to the album orderer terminal, the album orderer terminal including a display section for displaying the plurality of album samples transmitted by the sample transmitting section.

3. The album creating system as set forth in claim 2, wherein the layout information generating section selecting a plurality of low-quality images as candidates for an image layout frame indicative of the position at which the low-quality image should be laid out in the low-quality image album, and the display section selectively displaying any of the plurality of low-quality images selected as candidates for the image layout frame at displaying the album sample transmitted by the sample transmitting section.

4. The album creating system as set forth in claim 2, wherein the album orderer terminal further including:

a low-quality image generating section for generating a low-quality image by reducing the quality of a high-quality image;

a corresponding information applying section for applying corresponding information indicating that the high-quality image is corresponded to the low-quality image generated by reducing the quality of the high-quality image to the high-quality image and the low-quality image; and an in extracting section for extracting the high-quality image corresponding to selected low-quality image and causing the display section to display the same when the low-quality image in the album sample displayed by the display section is selected.

5. The album creating system as set forth in claim 1, wherein the album creating apparatus is a terminal installed in a shop.

\* \* \* \* \*